United States Patent
Iverson et al.

(10) Patent No.: US 10,446,868 B2
(45) Date of Patent: Oct. 15, 2019

(54) FUEL CELL SUBASSEMBLIES INCORPORATING SUBGASKETED THRIFTED MEMBRANES

(71) Applicant: 3M INNOVATIVE PROPERTIES COMPANY, St. Paul, MN (US)

(72) Inventors: Eric J. Iverson, Eau Claire, WI (US); Daniel M. Pierpont, North Saint Paul, MN (US); Michael A. Yandrasits, Hastings, MN (US); Steven J. Hamrock, Stillwater, MN (US); Stephan J. Obradovich, Menomonie, WI (US); Donald G. Peterson, Shoreview, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 424 days.

(21) Appl. No.: 15/005,571

(22) Filed: Jan. 25, 2016

(65) Prior Publication Data

US 2016/0141642 A1 May 19, 2016

Related U.S. Application Data

(60) Division of application No. 14/100,132, filed on Dec. 9, 2013, now Pat. No. 9,276,284, which is a
(Continued)

(51) Int. Cl.
*H01M 8/02* (2016.01)
*H01M 8/24* (2016.01)
*H01M 8/10* (2016.01)
*H01M 8/2418* (2016.01)
(Continued)

(52) U.S. Cl.
CPC ....... *H01M 8/2418* (2016.02); *H01M 8/0273* (2013.01); *H01M 8/0276* (2013.01);
(Continued)

(58) Field of Classification Search
CPC .......... H01M 8/00; H01M 8/02; H01M 8/10; H01M 8/0236; H01M 8/0273; H01M 8/242
See application file for complete search history.

(56) References Cited

U.S. PATENT DOCUMENTS 6,063,517 A    5/2000  Montemayor
6,547,229 B1 * 4/2003  Hanson ............... B65H 29/243
                                           156/230
(Continued)

FOREIGN PATENT DOCUMENTS

EP    1 443 579    8/2004
EP    1 804 325    7/2007
(Continued)

OTHER PUBLICATIONS

International Search Report, Form PCT/ISA/210, International Application No. PCT/US2010/061244, International Filing Date: Dec. 20, 2010 (4 pages).

*Primary Examiner* — Kenneth J Douyette
(74) *Attorney, Agent, or Firm* — Thomas M. Spielbauer

(57) ABSTRACT

An automated roll to roll method of making a fuel cell roll good subassembly is described wherein an elongated first subgasket web having a plurality of apertures is moved relative to a plurality of individual electrolyte membranes, each individual electrolyte membrane having a center region. The individual electrolyte membranes are aligned with the first subgasket web so that a center region of each electrolyte membrane is aligned with an aperture of the first subgasket web and the individual electrolyte membranes are attached to the first subgasket web.

13 Claims, 30 Drawing Sheets

Related U.S. Application Data continuation of application No. 12/972,959, filed on Dec. 20, 2010, now Pat. No. 8,637,205.

(60) Provisional application No. 61/289,036, filed on Dec. 22, 2009.

(51) Int. Cl.

| | | |
|---|---|---|
| *H01M 8/0273* | (2016.01) | |
| *H01M 8/0276* | (2016.01) | |
| *H01M 8/1004* | (2016.01) | |
| *H01M 8/0286* | (2016.01) | |
| *H01M 8/242*  | (2016.01) | |
| *H01M 8/1016* | (2016.01) | |
| *H01M 8/1018* | (2016.01) | |

(52) U.S. Cl.
CPC ....... *H01M 8/0286* (2013.01); *H01M 8/1004* (2013.01); *H01M 8/242* (2013.01); *H01M 8/1016* (2013.01); *H01M 2008/1095* (2013.01); *Y02P 70/56* (2015.11)

(56) References Cited

U.S. PATENT DOCUMENTS

| 6,585,846 | B1 | 7/2003 | Hanson |
|---|---|---|---|
| 8,637,205 | B2 | 1/2014 | Iverson |
| 2002/0022170 | A1 | 2/2002 | Franklin |
| 2003/0017092 | A1 | 1/2003 | Todd |
| 2003/0221311 | A1 | 12/2003 | Smith et al. |
| 2004/0241525 | A1* | 12/2004 | Mekala ............ H01M 4/8828 156/263 |
| 2005/0058870 | A1 | 3/2005 | Healy |
| 2005/0095490 | A1 | 5/2005 | Mittelstadt et al. |
| 2006/0078781 | A1 | 4/2006 | Stegink |
| 2007/0148517 | A1 | 6/2007 | Merlo |
| 2007/0231662 | A1* | 10/2007 | Goto ................ H01M 8/2483 429/482 |
| 2007/0268590 | A1 | 11/2007 | Schwerdtner |
| 2008/0105354 | A1 | 5/2008 | James |
| 2008/0107944 | A1 | 5/2008 | Goebel |
| 2008/0142152 | A1 | 6/2008 | Debe |
| 2008/0145712 | A1* | 6/2008 | Pierpont ............. B32B 37/203 429/509 |
| 2009/0219432 | A1 | 9/2009 | Palum |

FOREIGN PATENT DOCUMENTS

| EP | 1 921 701 | 5/2008 |
|---|---|---|
| JP | 2007-066766 | 3/2007 |
| WO | WO 2000/10216 | 2/2000 |
| WO | WO 2004/107483 | 12/2004 |
| WO | WO 2005/035247 | 4/2005 |
| WO | WO 2007/113589 | 10/2007 |
| WO | WO 2008/073679 | 6/2008 |

* cited by examiner

FUEL CELL SUBASSEMBLIES INCORPORATING SUBGASKETED THRIFTED MEMBRANES

CROSS-REFERENCE TO RELATED APPLICATIONS

This application is a divisional application of U.S. patent application Ser. No. 14/100,132, filed Dec. 9, 2013, now U.S. Pat. No. 9,276,284, which is a continuation application of U.S. patent application Ser. No. 12/972,959, filed Dec. 20, 2010, now issued as U.S. Pat. No. 8,637,205, which claims the benefit of U.S. Provisional Patent Application No. 61/289,036, filed Dec. 22, 2009, the disclosures of which are incorporated by reference in their entireties herein.

This Invention was made with U.S. Government support under Contract No. DE-FG36-07GO17006 awarded by the Department of Energy. The Government has certain rights in this invention.

FIELD OF THE INVENTION

The present invention relates generally to fuel cell subassemblies and systems for fabrication of fuel cell subassemblies.

BACKGROUND

A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

A typical fuel cell power system includes a power section in which one or more stacks of fuel cells are provided. The efficacy of the fuel cell power system depends in part on the integrity of the various contacting and sealing interfaces within individual fuel cells and between adjacent fuel cells of the stack.

A subgasket may be deployed on the electrolyte membrane of a fuel cell to seal the active regions of the fuel cell and to provide dimensional stability to the electrolyte membrane. Under pressure, the edges of fuel cell components in the stack can cause local stress concentrations on the membrane which may cause failure of the fuel cell. Subgaskets provide support to the membranes to reduce the occurrence of this failure mechanism.

SUMMARY

Embodiments involve a fuel cell roll good subassembly having a plurality of individual electrolyte membranes. One or more first subgaskets are attached to the individual electrolyte membranes. Each of the first subgaskets have at least one aperture and the first subgaskets are arranged so that first surfaces of the center regions of the individual electrolyte membranes are exposed through the apertures of the first subgaskets. A second subgasket comprises a web having a plurality of apertures. The second subgasket web is arranged so that second surfaces of the center regions of the individual electrolyte membranes are exposed through the apertures of the second subgasket web.

Other embodiments include a fuel cell roll good subassembly including a subgasket web having a plurality of apertures attached to a plurality of individual electrolyte membranes. The subgasket web is arranged so that surfaces of the center regions of the individual electrolyte membranes are exposed through the apertures of the subgasket web.

Some embodiments involve a fuel cell assembly including an electrolyte membrane having a first subgasket adhesively attached to the electrolyte membrane. The first subgasket has a first subgasket surface oriented toward the electrolyte membrane and a first adhesive layer disposed on the first subgasket surface. The fuel cell assembly includes a second subgasket, having a second subgasket surface oriented toward the electrolyte membrane. The second subgasket does not include a second adhesive layer on substantial portions of the second subgasket surface.

A fuel cell roll good subassembly includes a plurality of individual electrolyte membranes, each individual electrolyte membrane having a center region. One or more first subgaskets are adhesively attached to the individual electrolyte membranes, each of the first subgaskets having at least one aperture. The first subgaskets arranged so the center regions of the individual electrolyte membranes are exposed through the apertures of the first subgaskets. The fuel cell roll good assembly also includes a second subgasket comprising a web having a plurality of apertures. The second subgasket web is arranged so that second surfaces of the center regions of the individual electrolyte membranes are exposed through the apertures of the second subgasket web. An adhesive layer is not disposed on substantial portions of the second subgasket surface.

An automated roll to roll method of making a fuel cell roll good subassembly includes providing relative motion between an elongated first subgasket web having a plurality of apertures and a plurality of individual electrolyte membrane. The individual electrolyte membranes are aligned with the first subgasket web so that a center region of each electrolyte membrane is aligned with an aperture of the first subgasket web. The individual electrolyte membranes are attached to the first subgasket web.

According to one implementation, the first subgasket web may be cut into a plurality of individual subgasketed membranes. A second subgasket web having a plurality of apertures is aligned with the plurality of individual subgasketed membranes so that a center region of each electrolyte membrane is aligned with an aperture of the second subgasket web. The individual subgasketed membranes are attached to the second subgasket web.

According to another implementation, a second subgasket web having a plurality of apertures may be aligned and attached to the first subgasket web having the individual membranes attached thereto.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
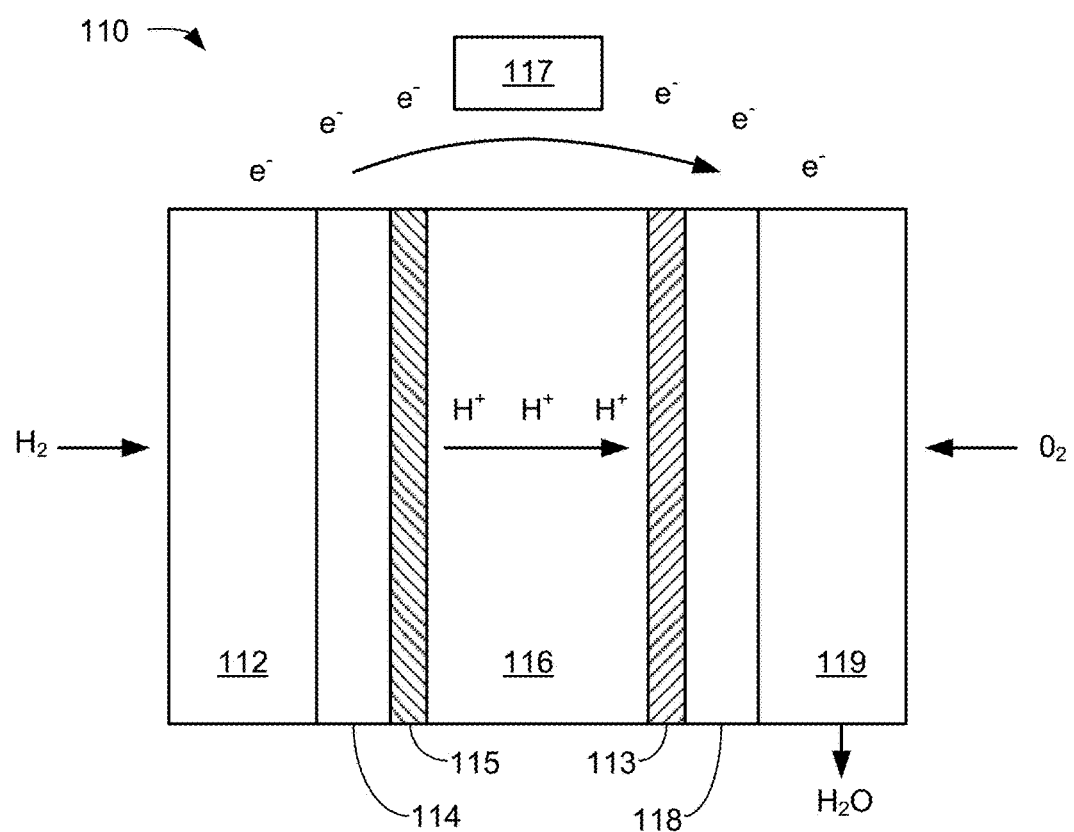
FIG. 1 depicts a typical fuel cell and its basic operation.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The basic components of a fuel cell 110 (without subgaskets, gaskets, or seals) are depicted in FIG. 1. In operation, hydrogen fuel, $H_2$, is introduced into the anode portion of the fuel cell 110, passing over the first fluid flow plate 112 and through the gas diffusion layer (GDL) 114. On the surface of the catalyst layer 115, the hydrogen fuel is separated into hydrogen ions ($H^+$) and electrons ($e^-$).

The electrolyte membrane 116 permits only the hydrogen ions or protons and water to pass through the electrolyte membrane 116 to the cathode catalyst layer 113 of the fuel cell 110. The electrons cannot pass through the electrolyte membrane 116 and, instead, flow through an external electrical circuit in the form of electric current. This current can power an electric load 117, such as an electric motor, or can be directed to an energy storage device, such as a rechargeable battery.

Oxygen, $O_2$, flows through the second flow field plate 119 and through the second GDL 118 at the cathode side of the fuel cell 110. On the surface of the cathode catalyst layer 113, oxygen, protons, and electrons combine to produce water ($H_2O$) and heat.

Individual fuel cells, such as the fuel cell 110 shown in FIG. 1, can be combined with a number of other fuel cells to form a fuel cell stack. The number of fuel cells within the stack determines the total voltage of the stack, and the surface area of each of the cells determines the total current. The total electrical power generated by a given fuel cell stack can be determined by multiplying the total stack voltage by total current.

A fuel cell stack is a sealed structure. Subgaskets, gaskets and/or seals are typically deployed around the perimeter of the active area of the electrolyte membrane. Catalyst may be disposed on the surfaces of the membrane, on the GDLs, or may be disposed partially on the GDLs and partially on the membrane. The subgaskets and/or gaskets may be placed on, over, or about one or both surfaces of the electrolyte membrane, and/or on one or both surfaces of the GDLs, and/or on one or both surfaces of the fluid flow plates that face the GDLs.

Mass production of MEAs and/or fuel cell other subassemblies is needed to reduce the cost of fuel cell power generation to a point that will allow incorporation of this technology into wider use. In addition to mass production, reduction in the component costs also brings down the overall cost of the final product. The electrolyte membrane is one of the more expensive components of an MEA and it is generally desirable to decrease the amount of electrolyte membrane used to form roll good fuel cell subassemblies, thereby decreasing the cost of the fuel cell stacks. Techniques for decreasing the amount of electrolyte membrane used in an MEA is referred to herein a "membrane thrifting."

Some embodiments discussed herein illustrate membrane thrifted fuel cell subassembly webs, as well as processes and systems for making thrifted fuel cell subassembly webs. Membrane thrifting involves manufacturing processes that conserve membrane material to lower the overall cost of fuel cell subassembly roll good products, for example.

Some embodiments illustrate subgasketed fuel cell subassemblies including an electrolyte membrane or catalyst coated membrane (CCM) disposed between first and second half subgaskets. The first half subgasket has a first surface oriented toward the electrolyte membrane and the second half subgasket has a second surface oriented toward the electrolyte membrane. At least one of the first and second half gasket surfaces has an adhesive layer. Substantial portions of at least one of the first and second half gasket surfaces has no adhesive layer. "Substantial portions" of a subgasket surface having no adhesive layer means at least 25% of the subgasket surface, or at least 50% of the subgasket surface, or substantially all of the subgasket surface has no adhesive layer. In MEAs having a first half gasket with an adhesive layer and second half gasket that is devoid of adhesive, the second half gasket is adhesively attached to the first half subgasket via the adhesive layer of the first half subgasket and is not attached to the membrane by adhesive.

In some applications, a subgasket comprising a first half subgasket having adhesive on the surface facing the electrolyte membrane and a second half subgasket having substantial portions or all of the surface facing the electrolyte membrane devoid of an adhesive layer improves the stability of subgasketed fuel cell subassemblies. For example, at temperatures exceeding 80 degrees C. and under pressure, the electrolyte membrane can be displaced relative to the subgasket by extrusion or shifting of the electrolyte membrane even though an adhesive layer is present on the surfaces of both subgasket layers. Without wishing to be bound by any specific theory for this phenomenon, one explanation is that at higher temperatures the adhesive present at the interface of the subgasket layers and membrane becomes slightly more lubricating, allowing the membrane to shift and/or extrude when pressure is applied. However, when a substantial portion of at least one subgasket surface has no adhesive present, shifting and/or extrusion of the membrane is decreased even though a substantial portion of the other subgasket surface includes adhesive. The decreased shifting and/or extrusion of the electrolyte membrane may be due to the increased friction between the electrolyte membrane and the subgasket layer without adhesive.

Figure 2A:
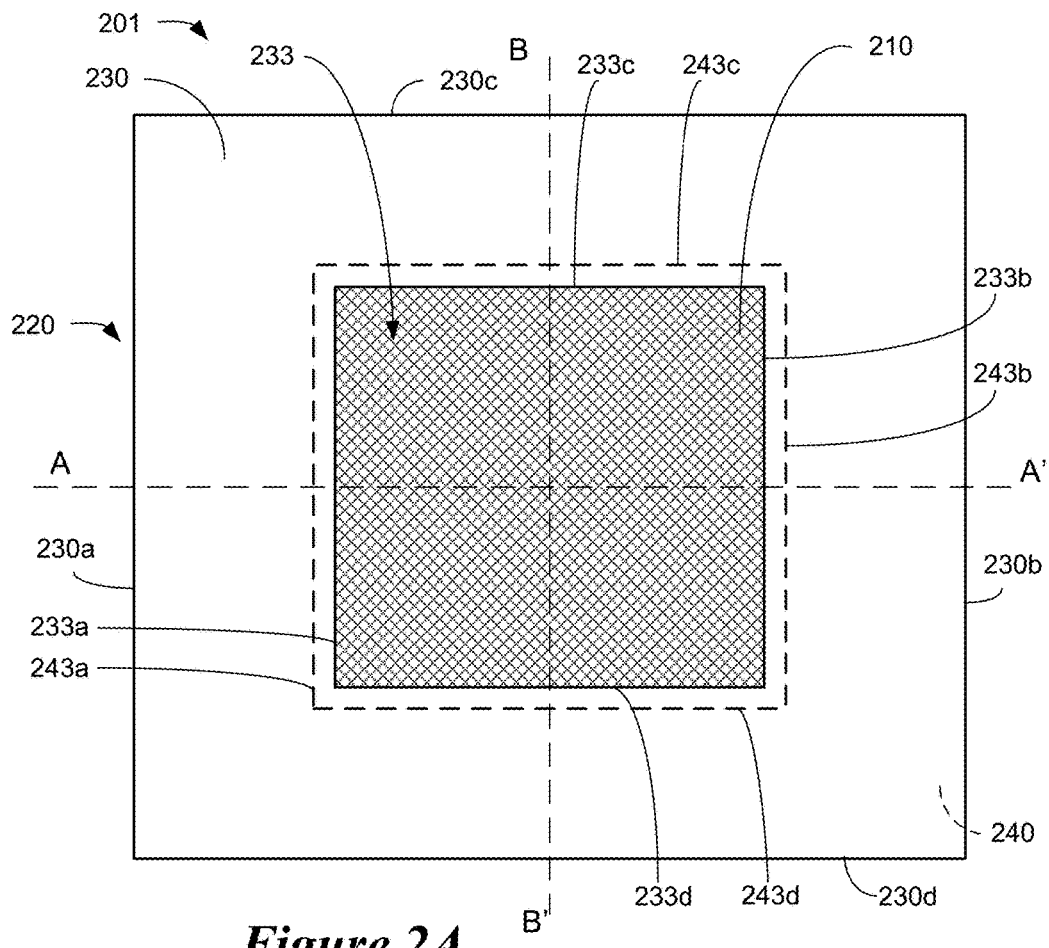
FIGS. 2A, 2B, and 2C are plan and cross section views of a fuel cell subassembly incorporating a thrifted electrolyte membrane and a one sided adhesive subgasket.
Figure 2B:
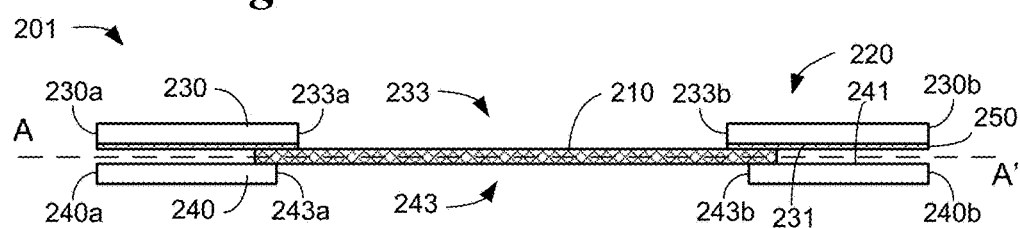
Figure 2C:
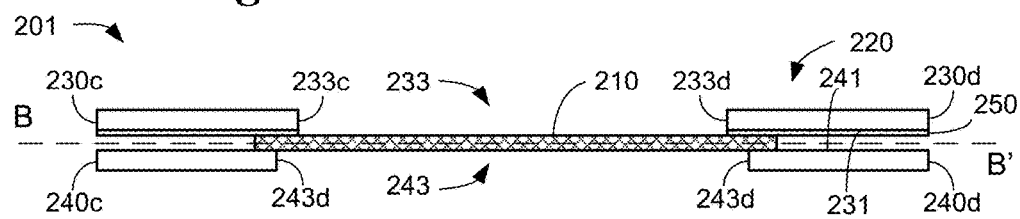

FIG. 2A is a plan view and FIGS. 2B and 2C are cross sectional views taken through lines A-A' and B-B', respectively, of fuel cell subassembly 201. The subassembly 201 comprises an electrolyte membrane 210 and a subgasket 220 comprising first and second half subgaskets 230, 240. Half subgaskets 230, 240 are disposed at the perimeter of the electrolyte membrane 210 and have the form of a "frame" having apertures 233, 243 through which center portions of the electrolyte membrane 210 are exposed. Although rectangular frame-shaped half subgaskets are shown in FIG. 2A, the half subgaskets may take on any shape, e.g., circular, pentagonal, hexagonal, etc. In addition, each half subgasket 230, 240 may be one continuous layer, or may include several pieces that are arranged around the perimeter of the electrolyte membrane. Each of the half subgaskets 230, 240, may include one or more layers.

The first half subgasket 230 may the same size or a different size from the second half subgasket 240. If the first half subgasket and the second half subgasket are the same size, as depicted in FIGS. 2A-2C, then the edges 230$a$, 230$b$, 230$c$, 230$d$ of the first half subgasket 230 align with corresponding edges 240$a$, 240$b$, 240$c$, 240$d$ of the second half subgasket 240. However if the first half subgasket and the second half subgasket are not the same size, then one or more edges of the first half subgasket do not align with the corresponding edges of the second half subgasket.

The first half subgasket aperture 233 may be the same size or a different size from the second half subgasket aperture 243. FIGS. 2A-2C illustrate an implementation wherein the aperture 233 of the first half subgasket 230 is smaller than the aperture 243 of the second half subgasket 240. When the first half subgasket aperture 233 is smaller than the second half subgasket aperture 243, then or more of the first half subgasket aperture edges 233$a$, 233$b$, 233$c$, 233$d$ do not align with corresponding ones of the second half subgasket aperture edges 243$a$, 243$b$, 243$c$, 243$d$. In some configurations, the first half subgasket aperture is the same size as the second half subgasket aperture in which case the aperture edges of the first and second half subgaskets align.

The first half subgasket 230 has a first surface 231 oriented toward the electrolyte membrane 210. An adhesive layer 250, comprising, e.g., a pressure sensitive adhesive (PSA) or other type, is disposed on the first surface 231. The second half subgasket has a second surface 241 oriented toward the electrolyte membrane 210. Substantial portions of the second surface 241 of the second half subgasket 240 have no adhesive or the entire second surface 241 has no adhesive. An adhesive may be present on the second gasket surface, so long as substantial portions of at least one of the first and second gasket surfaces oriented toward the membrane do not include an adhesive. Substantial portions devoid of adhesive promote friction between the subgasket surfaces and the membrane for positional stability of the membrane during temperatures and pressures associated with fuel cell operation. Although the second surface 241 of the second half subgasket does not have an adhesive layer, it is adhesively attached to the first half subgasket via the adhesive layer 250 disposed on the first surface 231 of the first half subgasket. The second half subgasket is not adhesively attached to the membrane.

Electrolyte membrane 210 is "thrifted" in the x and y directions which means that electrolyte membrane extends only partially under the half subgaskets 230, 240. Membrane thrifting as used herein refers to reducing the amount of electrolyte membrane used to form the fuel cell subassembly by reducing the x and/or y dimensions of the electrolyte membrane.

Figure 2D:
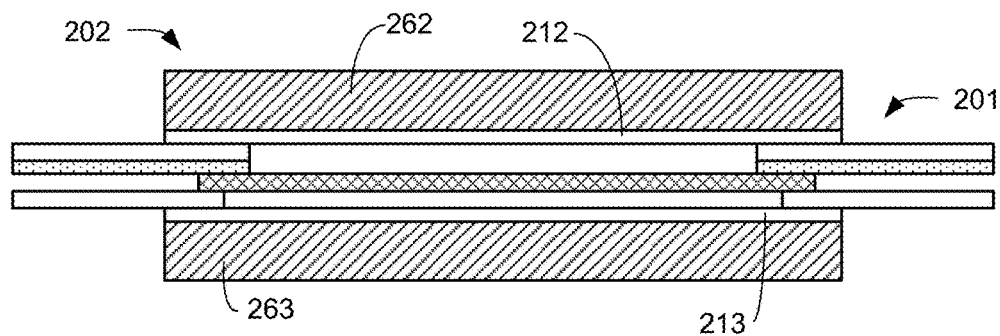
FIG. 2D is a cross section view of a five layer membrane electrode assembly incorporating the subgasketed membrane of FIG. 2A and catalyst coated gas diffusion layers.

FIG. 2D is a cross section of a subgasketed 5 layer membrane electrode assembly (MEA) 202 which includes the subgasketed electrolyte membrane 201, as described in more detail in connection with FIGS. 2A-2C, and catalyst coated GDLs comprising catalyst layers 212, 213 disposed on GDLs 262, 263.

Figure 2E:
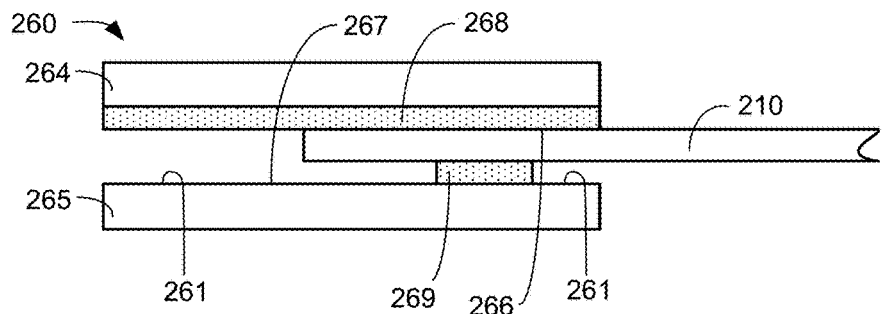
FIGS. 2E-2G illustrate various subgasketed electrolyte membrane wherein substantial portions of at least one subgasket layer have no adhesive.

FIG. 2E illustrates a portion of a subgasket 260 and membrane 210. The subgasket includes first and second half subgaskets 264, 265. First and second half subgaskets 264, 265 have first and second subgasket surfaces 266, 267 oriented toward the membrane 210. In this example, the first surface 266 is substantially covered with a first adhesive layer 268. The second surface 267 has a second adhesive layer 269. However, a substantial portion 261 of the second half subgasket surface 267 is devoid of adhesive layer.

Figure 2F:
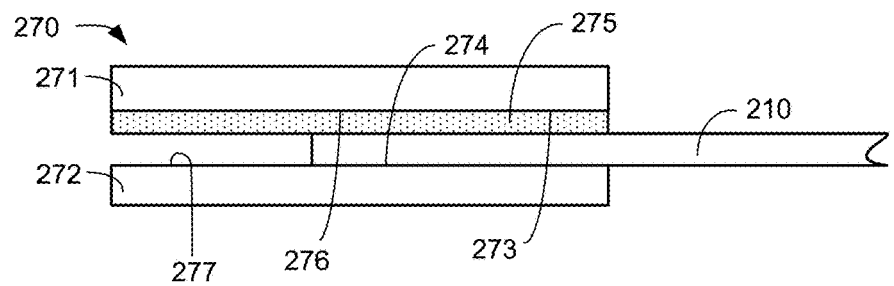

In some embodiments, the first half subgasket surface has adhesive over most or all of the first have subgasket surface and the second half subgasket surface has no adhesive. FIG. 2F illustrates a subgasket 270 having first and second half subgaskets 271, 272 deployed over a membrane 210. The first and second half subgaskets 271, 272 have first and second subgasket surfaces 273, 274, respectively, oriented toward the membrane 210. An adhesive layer 275 is disposed over most of the first half subgasket surface 273. The second subgasket surface 274 has no adhesive.

Figure 2G:
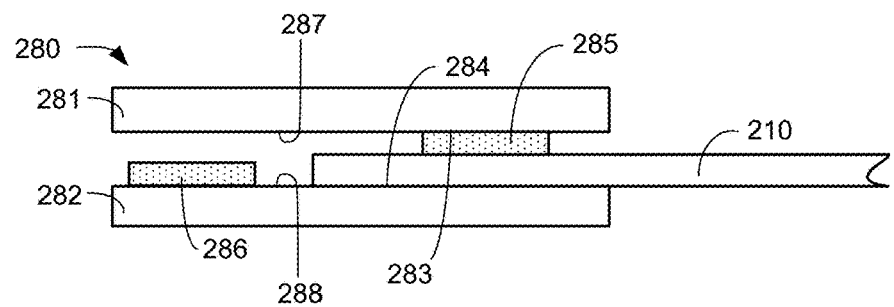

In some embodiments, both subgasket surfaces have some portions with adhesive and both subgasket surfaces have substantial portions that do not have adhesive. FIG. 2G illustrates a subgasket 280 having first and second half subgaskets 281, 282 deployed over a membrane 210. The first and second half subgaskets 281, 282 have first and second subgasket surfaces 283, 284, respectively, oriented toward the membrane 210. One or more portions of the first subgasket surface 283 have an adhesive layer 285. One or more portions of the second subgasket surface 284 have an adhesive layer 286. A substantial portion 287 of the first subgasket surface 283 is devoid of adhesive. A substantial portion 288 of the second subgasket surface 284 is devoid of adhesive. For some subgasketed membrane constructions, such as the constructions illustrated in FIGS. 2F and 2G, no adhesive is present at either subgasket surface for at least some portion of the interface between half subgaskets and/or the interface between each subgasket layer and the membrane.

In some embodiments, at least one of the half subgaskets includes a surface treatment that reduces the amount of membrane movement between the first and second half subgaskets. For example, the surface treatment may increase friction between the first and second subgasket surfaces that face the membrane and/or may increase friction between the subgasket surfaces and the membrane. Exemplary surface treatments may include, for example, coronas, plasma treatments, primers, the presence of microstructures on one or both surfaces of the subgasket that face the membrane, and/or roughening one or both surfaces of the subgasket that face the membrane and/or other treatments. Surface treatments can also be added on opposite side of subgasket to increase adhesion of adhesive to membrane or to plastic subgasket.

Figure 2H:
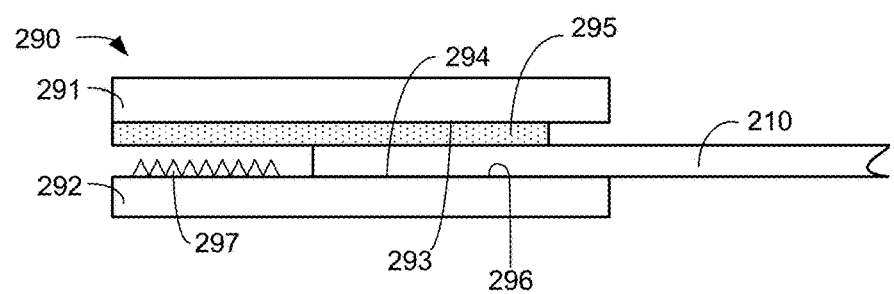
FIG. 2H illustrates a subgasketed electrolyte membrane wherein a portion of at least one of the subgasket layers includes a surface treatment that reduces membrane movement.

FIG. 2H illustrates a subgasketed membrane wherein at least a portion of the surface of the second half subgasket that faces the membrane has a surface treatment that increases friction and/or reduces the amount of membrane movement. A subgasket 290 includes first and second half subgaskets 291, 292 deployed over a membrane 210. The first and second half subgaskets 291, 292 have first and second subgasket surfaces 293, 294, respectively, oriented toward the membrane 210. One or more portions of the first subgasket surface 293 have an adhesive layer 295. A substantial portion 296 of the second subgasket surface 294 has no adhesive. One or both of the subgasket surfaces 293, 294 includes a surface treatment 297 that reduces membrane movement. For example, the surface treatment may increase friction between the membrane and the surface 294 of the second half subgasket. The surface treatment 297 may be present over substantially all of the subgasket surface 293, 294 or only a portion of the subgasket surface.

Figure 3A:
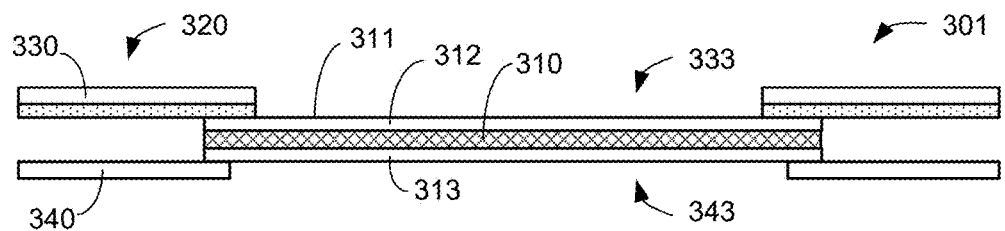
FIG. 3A is a cross section of a thrifted catalyst coated membrane with a one sided adhesive subgasket.
Figure 3B:
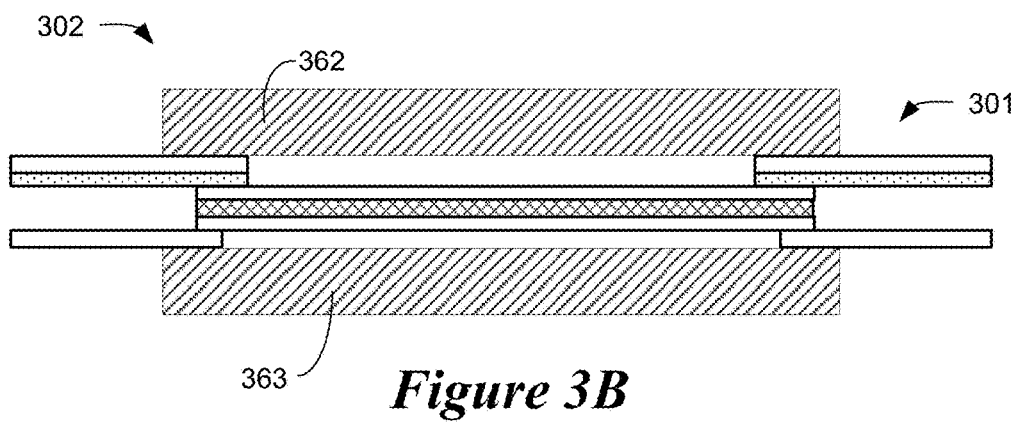
FIG. 3B is a cross section view of a five layer MEA incorporating the subgasketed catalyst coated membrane of FIG. 3A.

FIGS. 3A and 3B are cross sections of fuel cell subassemblies 301 and 302 respectively. Subassembly 301 is a subgasketed CCM and subassembly and 302 is a subgasketed 5 layer MEA. Subassemblies 301 and 302 include a catalyst coated membrane (CCM) 311 disposed between subgasket 320. The CCM 311 includes an electrolyte membrane 310 and catalyst layers 312, 313. Subgasket 320 includes a first half subgasket 330 that has an adhesive 350 and a second half subgasket 340 without adhesive. Half subgaskets 330, 340 are perimeter subgaskets that have the form of a frame with apertures 333, 343 through which portions, i.e., the center region of the CCM 311, is exposed. Subassembly 302 includes subassembly 301 with the addition of GDLs 362, 363 disposed on either side of the subgasketed CCM 301. As illustrated in the cross sectional diagram of FIGS. 3A and 3B, the CCM may be smaller in width than the width of the GDL. In other implementations, the CCM width may be larger than the width of the GDL or the CCM and GDL may have substantially equal widths. GDLs may be adhered using a suitable adhesive or bonded thermally to the subgasketed CCM.

Figure 3C:
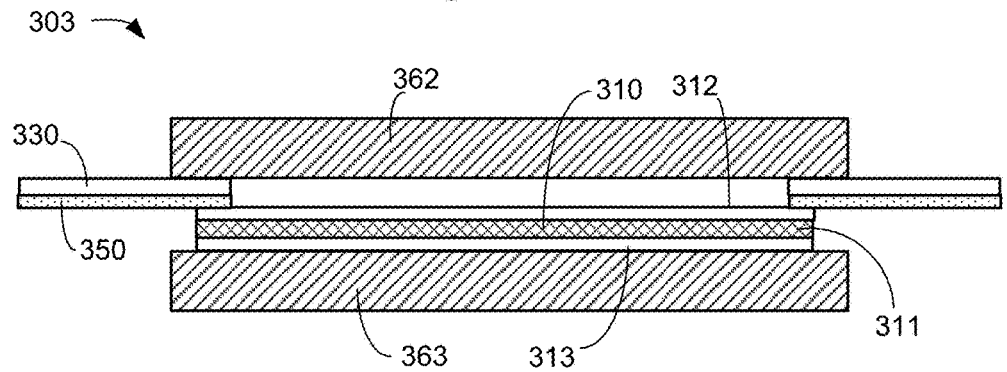
FIG. 3C illustrates an MEA incorporating a half subgasketed CCM.

In some implementations, the electrolyte membrane or CCM may be subgasketed with only a half subgasket, as illustrated by the MEA 303 depicted in FIG. 3C. In this exemplary implementation, MEA 303 includes a CCM 311 comprising an electrolyte membrane 310 and first and second catalyst layers 313, 313. A first half subgasket 330 has an adhesive layer 350. No second half subgasket is used in these implementations. The MEA also includes GDLs 362, 363 which are installed over the half gasketed CCM.

Figure 4:
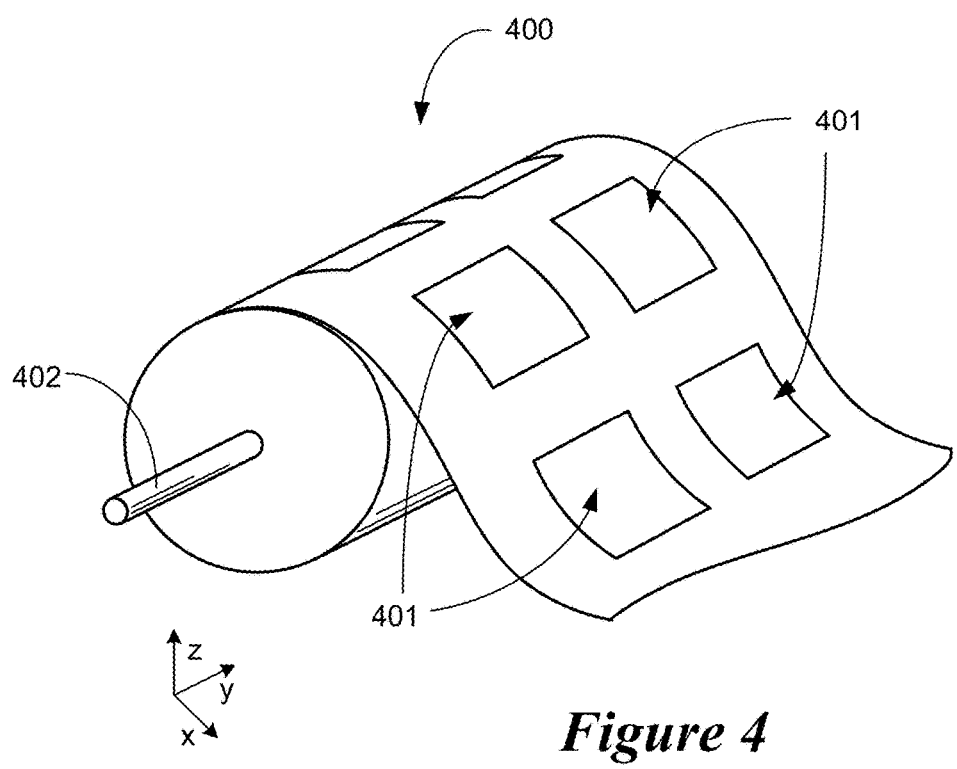
FIG. 4 illustrates a fuel cell roll good comprising a fuel cell subassembly web.

As illustrated in FIG. 4, fuel cell subassemblies 401 (e.g., subassemblies illustrated in FIGS. 2-3 can be produced as a roll good web 400 of multiple concatenated subassemblies. A "web" as discussed herein and illustrated in FIG. 4 is an article having an x axis dimension that is much greater than its y axis dimension, and having sufficient flexibility to be processed and stored as a roll. The roll good web 400 may include, for example, many half subgasketed or fully subgasketed fuel cell subassemblies 401, such as half or fully subgasketed membranes or CCMs, five layer MEAs and/or other fuel cell subassemblies 401. Multiple fuel cell subassemblies 401 may be disposed along the x axis of the web 400 and multiple fuel cell subassemblies 401 may be disposed across the y axis of the web 400. The roll good web 400 can be wound on a roller 402, with an appropriate liner material, if necessary, and may be sold in rolled form. After formation of the fuel cell subassembly roll good web 400, the web 400 can be cut into individual fuel cell subassemblies 401, e.g., MEAs. The individual MEAs may then be assembled into a fuel cell stack.

Roll good fuel cell subassembly webs can include electrolyte membranes and/or CCMs that are thrifted in both x and y directions in accordance with embodiments of the invention. Membrane thrifting in the y direction involves reduction of the width of the membrane, which could be a membrane web or a CCM web, in the y direction (cross-web direction). As illustrated in the following examples, membrane thrifting in the x direction (down web direction) for roll good fuel cell subassembly webs involves the use of multiple individual electrolyte membranes or CCMs to form multiple fuel cell subassemblies of a fuel cell subassembly web.

Figure 5A:
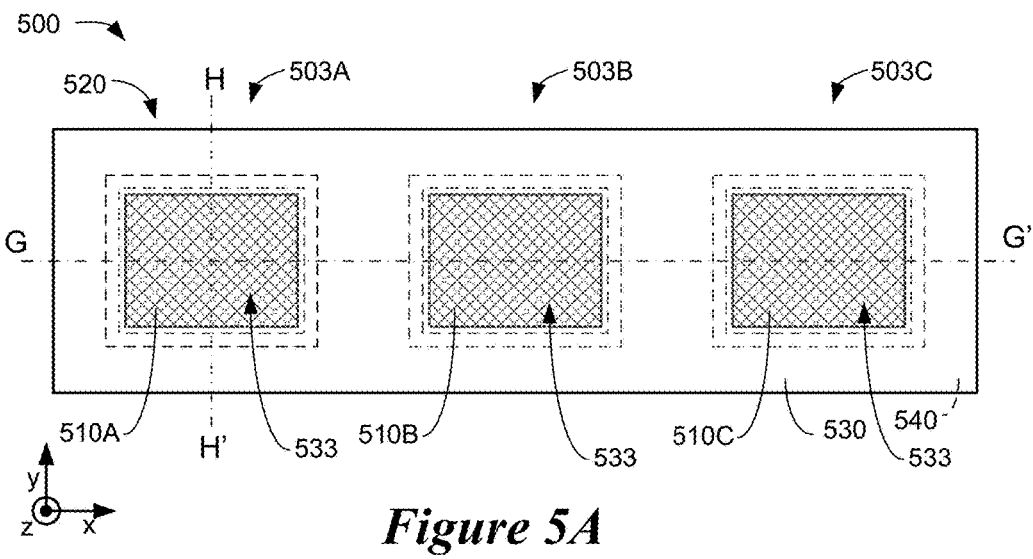
FIGS. 5A-5C are plan, y direction, and x direction cross sectional views of a fuel cell subassembly web comprising many concatenated fuel cell subassemblies.
Figure 5B:
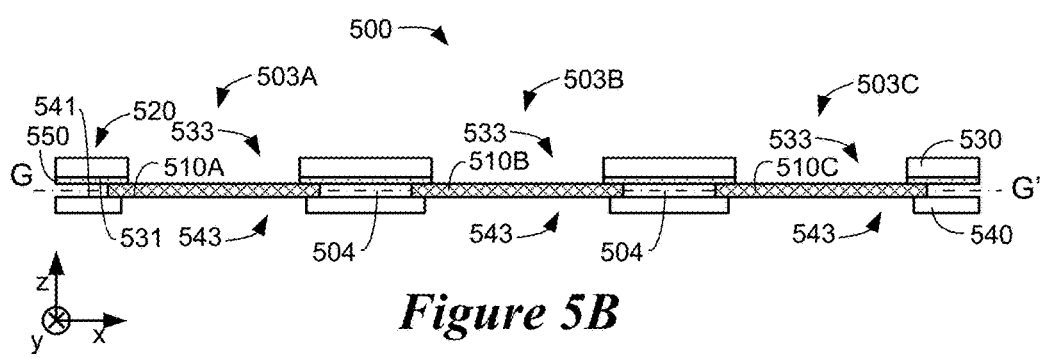
Figure 5C:
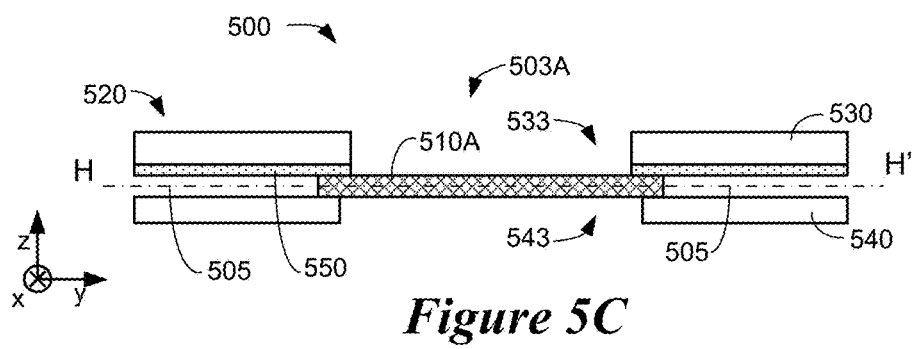

FIGS. 5A-5C illustrate a fuel cell subassembly web 500 comprising many concatenated fuel cell subassemblies, of which subassemblies 503A, 503B, 503C are shown. Fuel cell subassembly web 500 is illustrated in an unrolled condition in plan view (FIG. 5A), cross section view along line G-G' (FIG. 5B), and cross section view along line H-H' (FIG. 5C). In this implementation, multiple individual electrolyte membranes 510A, 510B, 510C are used. Subgasket 520 comprises first and second half subgasket webs 530, 540. First and second half subgasket webs 530, 540 have the form of a continuous ladder with apertures 533, 543 through which center portions the electrolyte membranes 510A, 510B, 510C are exposed. Adhesive layer 550 is disposed on the surface 531 of the first half subgasket web 530 that faces the individual electrolyte membranes 510A, 510B, 510C. There is no adhesive disposed on substantial portions of the surface 541 of the second half subgasket web 540 that faces the individual electrolyte membranes 510A, 510B, 510C.

As can be seen in the cross section of FIG. 5B, the use of individual electrolyte membranes 510A, 510B, 510C provides membrane thrifting in the x direction because membrane material is conserved in regions 504 between neighboring fuel cell subassemblies 503A, 503B, 503C. The use of individual membranes 510A, 510B, 510C also provides membrane thrifting in the y direction as illustrated by the cross section of FIG. 5C. Each of the individual electrolyte membranes 510A, 510B, 510C conserve membrane material at regions 505 along the sides of the fuel cell subassembly web 500 because the individual electrolyte membranes 510A, 510B, 510C only extend partially under the subgasket 520 in the y direction.

Membrane thrifting in the x and/or y directions conserves membrane material in regions between neighboring fuel cell assemblies in a fuel cell assembly web and/or conserves membrane material in regions along the sides of the fuel cell assembly web. In these regions, the electrolyte membrane extends under the subgasket to an extent necessary to achieve good structural stability for the fuel cell subassembly web 500 during manufacturing processes as well as good stability and sealing performance of the fuel cell subassemblies 503A, 503B, 503B when operated in a fuel cell stack.

Figure 5D:
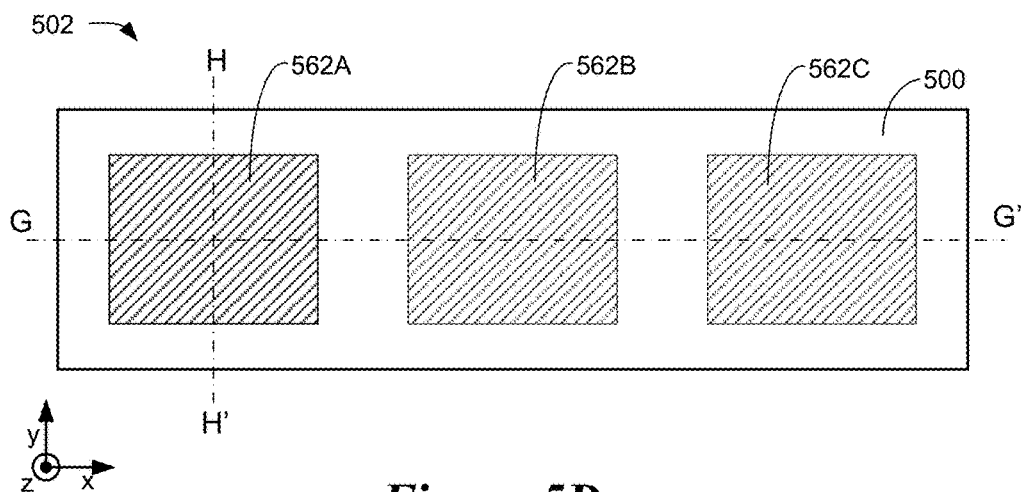
FIGS. 5D, 5E, and 5F are plan, y direction, and x direction cross sectional views, respectively, of a five layer MEA web incorporating the fuel cell subassembly web of FIG. 5A.
Figure 5E:
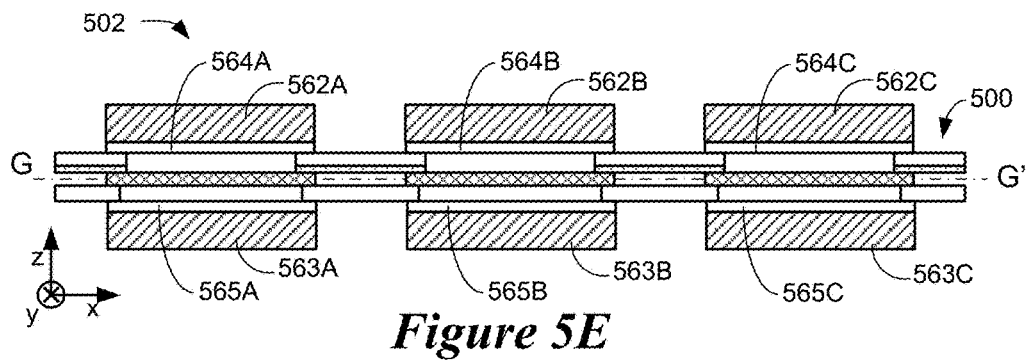
Figure 5F:
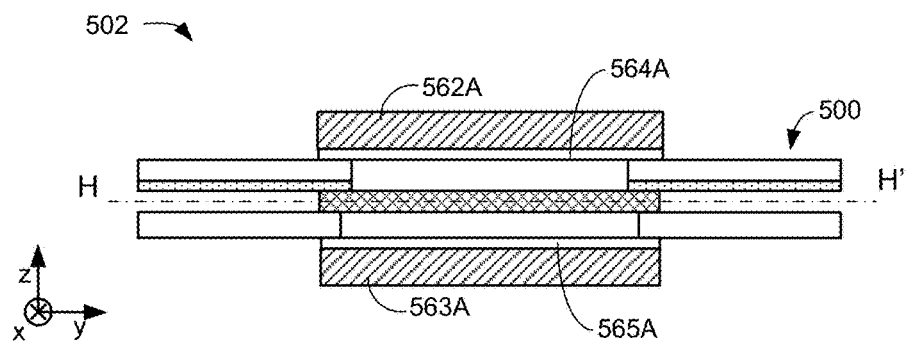

FIGS. 5D, 5E, and 5F illustrate plan, y direction, and x direction cross sectional view, respectively, of a five layer MEA web 502 formed by installing catalyst coated GDLs comprising GDLs 562A, 563A, 562B, 563B, 562C, 563C and catalyst coatings 564A, 565A, 564B, 565B, 564C, 565C on the fuel cell subassembly web 500.

Figure 5G:
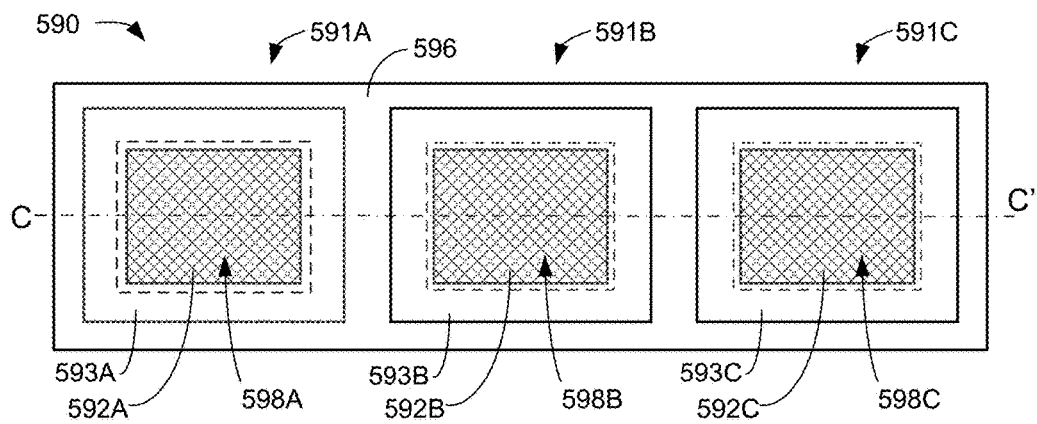
FIGS. 5G and 5H are plan and cross sectional views, respectively, of a fuel cell subassembly web comprising many concatenated fuel cell subassemblies having individual electrolyte membranes, and individual first subgaskets.
Figure 5H:
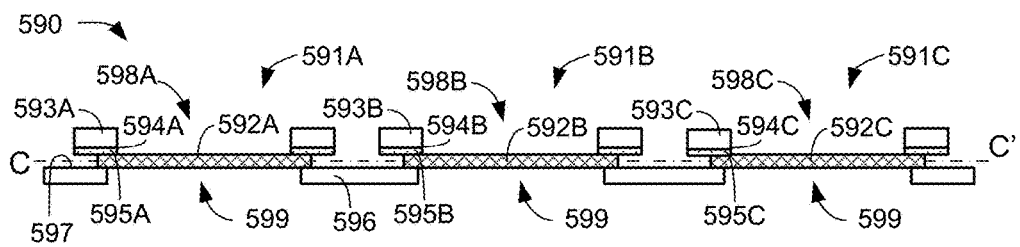

In some embodiments, the first half subgasket web discussed above may be replaced by a plurality of individual first half subgaskets 593A, 593B, 593C, as illustrated in FIGS. 5G and 5H. FIGS. 5G and 5H illustrate a fuel cell subassembly web 590 comprising many concatenated fuel cell subassemblies, of which subassemblies 591A, 591B, 591C are shown. Fuel cell subassembly web 590 is illustrated in an unrolled condition in plan view (FIG. 5G) and cross section view along line C-C' (FIG. 5H). In this implementation, multiple individual electrolyte membranes 592A, 592B, 592C are used. The fuel cell subassembly web 590 includes a number of individual first half subgaskets 593A, 593B, 593C, each having an aperture 598A, 598B, 598C through with center portions of the electrolyte membranes 592A, 592B, 592C are exposed. Each of the individual first half subgaskets 593A, 593B, 593C include adhesive layers 595A, 595B, 595C disposed on the first half subgasket surfaces 594A, 594B, 594C that face the individual electrolyte membranes 592A, 592B, 592C. The fuel cell subassembly web includes a second half subgasket web 596, which includes a number of apertures 599 through which center portions of the electrolyte membranes 592A, 592B, 592C are exposed. There is no adhesive disposed on substantial portions of the surface 597 of the second half subgasket web 596 that faces the individual electrolyte membranes 592A, 592B, 592C.

Figure 5I:
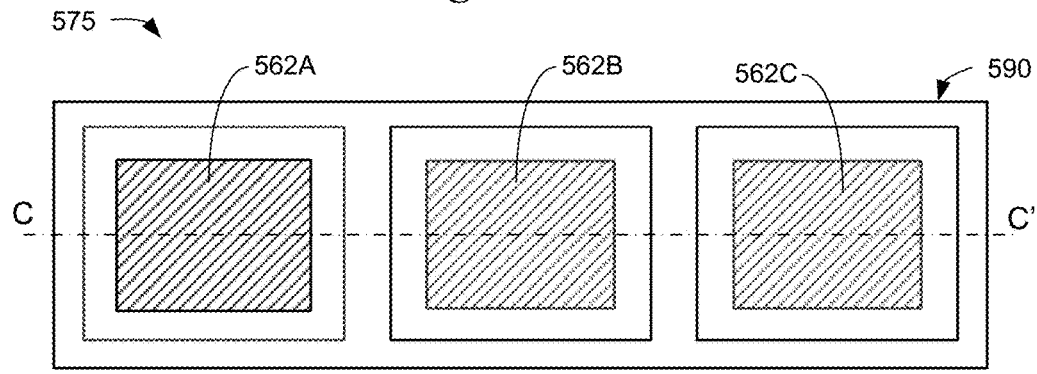
FIGS. 5I and 5J are plan and cross sectional views, respectively, of a five layer MEA web incorporating the fuel cell subassembly web of FIG. 5G.
Figure 5J:
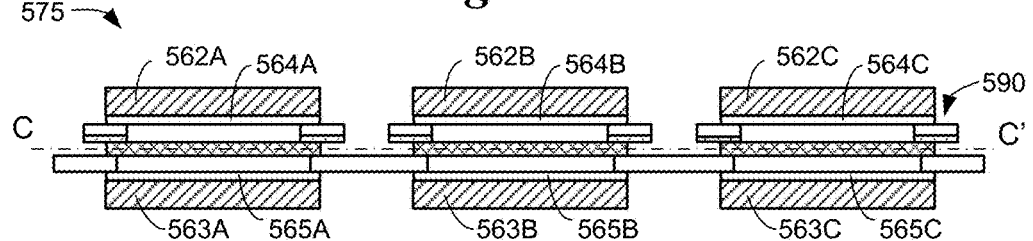

FIGS. 5I and 5J illustrate plan and y direction cross sectional views, respectively, of a five layer MEA web 575 formed by installing catalyst coated GDLs comprising GDLs 562A, 563A, 562B, 563B, 562C, 563C and catalyst coatings 564A, 565A, 564B 565B, 564C, 565C on the fuel cell subassembly web 590.

Figure 6A:
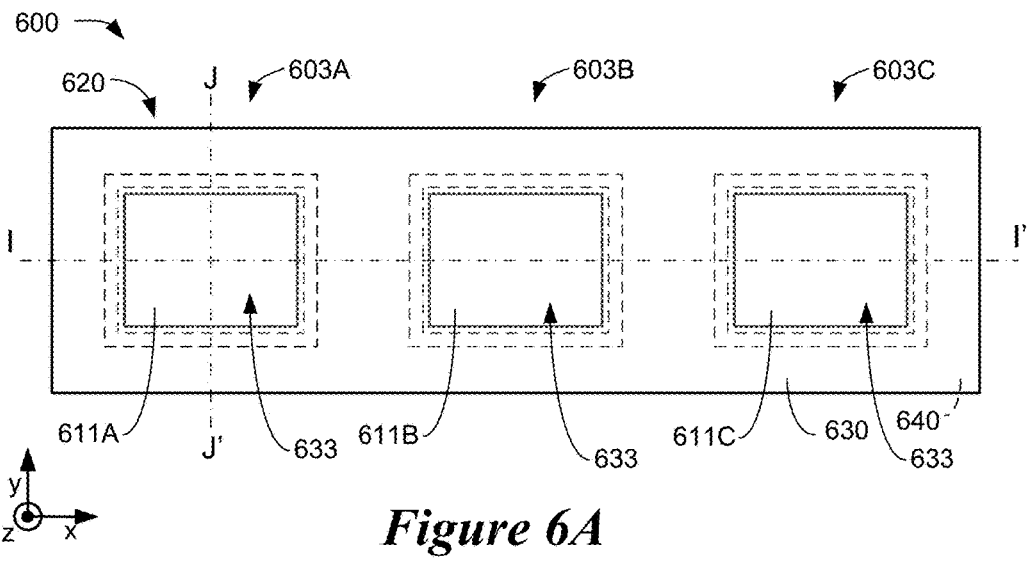
FIGS. 6A-6C illustrate a fuel cell subassembly web with CCM thrifting in x and y directions.
Figure 6B:
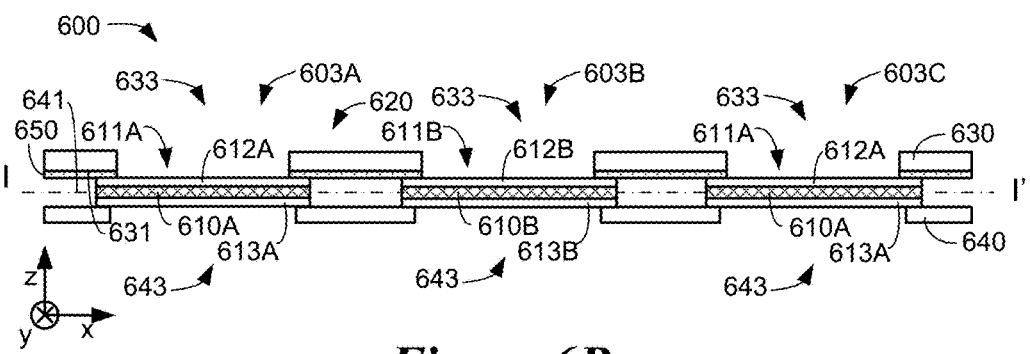
Figure 6C:
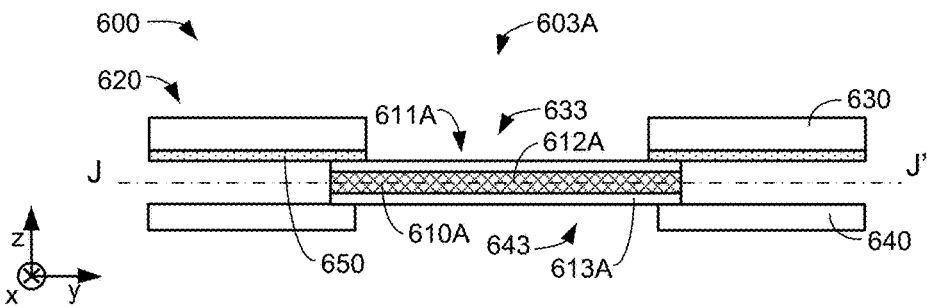

FIGS. 6A-6C illustrate a fuel cell subassembly web 600 with CCM thrifting in x and y directions. Fuel cell subassembly web 600 comprises many concatenated fuel cell subassemblies, of which subassemblies 603A, 603B, 603C are shown. Fuel cell subassembly web 600 is illustrated in an unrolled condition in plan view (FIG. 6A), cross section view along line I-I' (FIG. 6B), and cross section view along line J-J' (FIG. 6C). In this implementation, multiple individual CCMs 611A, 611B, 611C are used. The individual CCMs 611A, 611B, 611C include individual electrolyte membranes 610A, 610B, 610C with catalyst layers 612A, 613A, 612B, 613B, 612C, 613C.

Figure 6D:
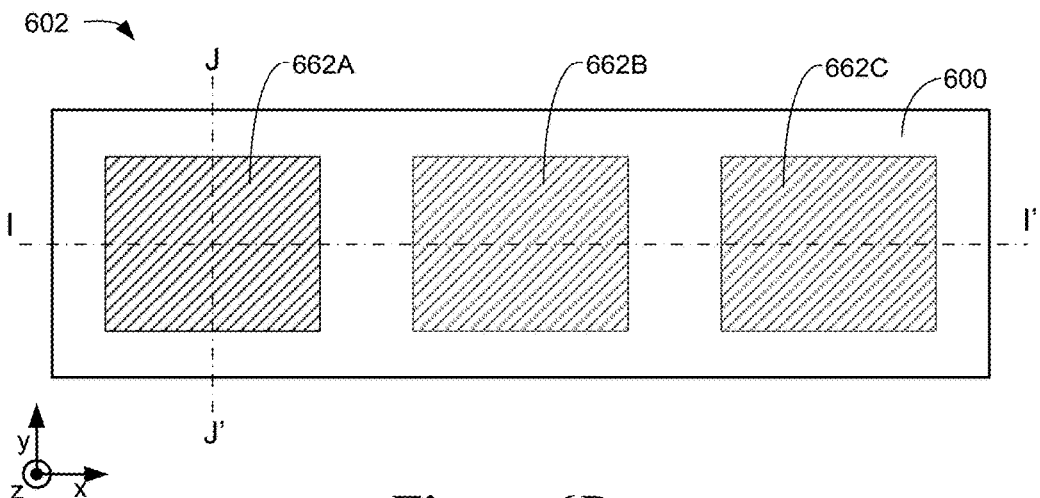
FIGS. 6D, 6E, and 6F illustrate a five layer MEA web that is formed using the fuel cell subassembly web of FIG. 6A.
Figure 6E:
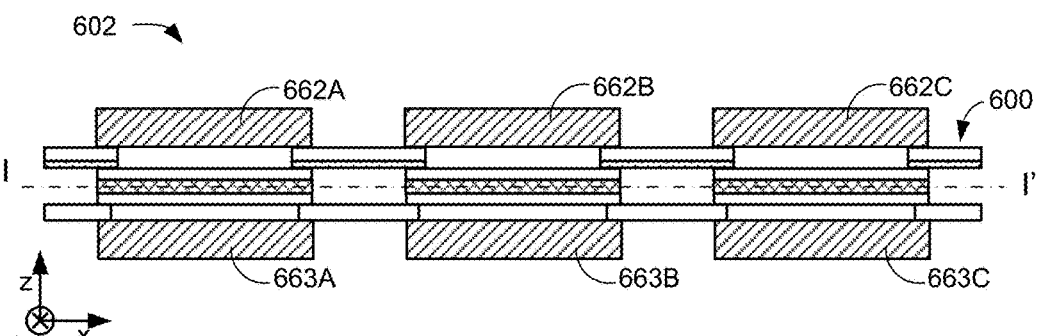
Figure 6F:
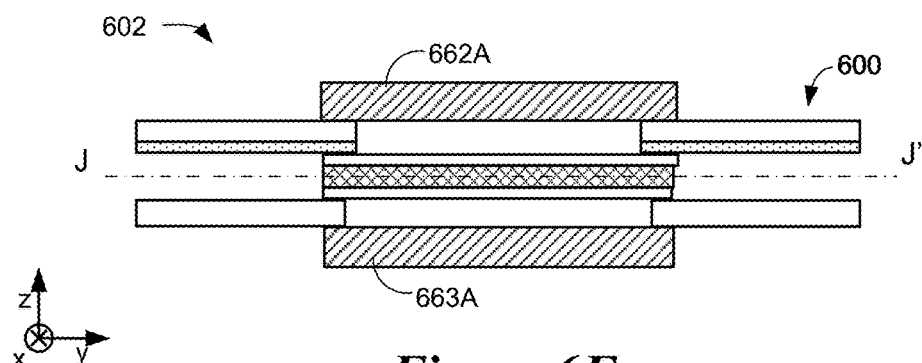

Subgasket 620 comprises first and second half subgasket webs 630, 640. First and second half subgasket webs 630, 640 have the form of continuous ladders with apertures 633, 643 through which center portions the CCMs 611A, 611B, 611C are exposed. Adhesive layer 650 is disposed on the surface 631 of the first half subgasket web 630 facing the individual CCMs 611A, 611B, 611C. Substantial portions of the second half subgasket web 640 has no adhesive on the surface 641 facing the individual CCMs 611A, 611B, 611C, e.g., the surface 641 is devoid of adhesive. FIGS. 6D, 6E, and 6F illustrate a five layer MEA web 602 that is formed using the fuel cell subassembly web 600 after installation of the GDLs 662A, 663A, 662B, 663B, 662C, 663C.

Figure 6G:
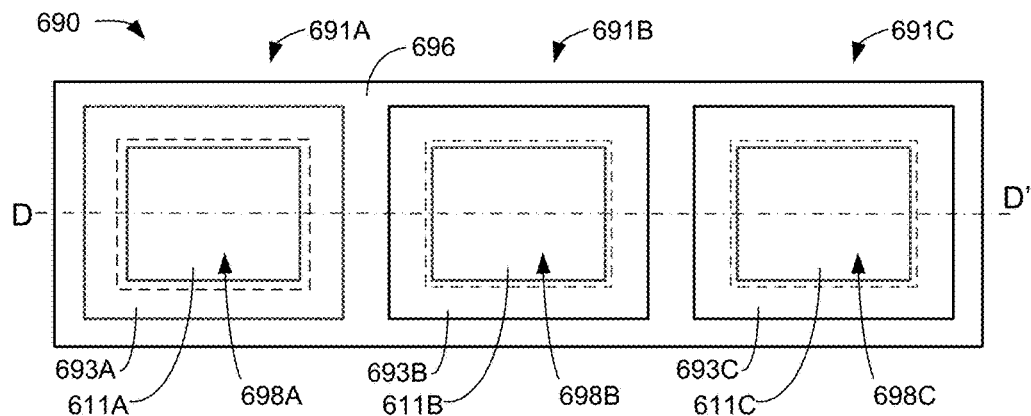
FIGS. 6G and 6H are plan and cross sectional views, respectively, of a fuel cell subassembly web comprising many concatenated fuel cell subassemblies having individual CCMs, and individual first subgaskets.
Figure 6H:
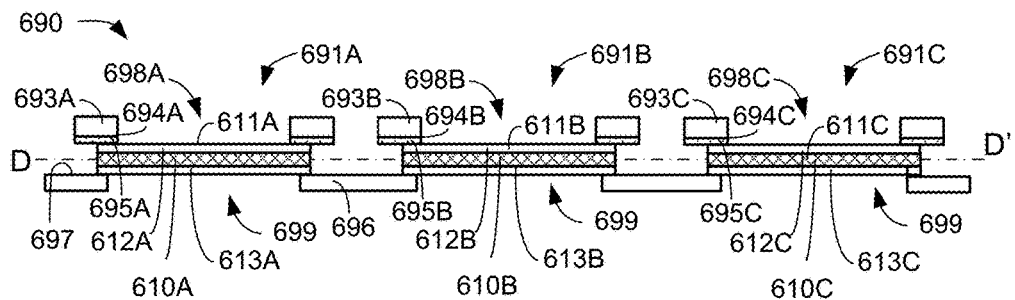

FIGS. 6G and 6H illustrate a fuel cell subassembly web 690 having individual first half subgaskets 693A, 693B, 693C in place of the first subgasket web illustrated in FIGS. 6A-6F. Fuel cell subassembly web 690 comprises many concatenated fuel cell subassemblies, of which subassemblies 691A, 691B, 691C are shown. Fuel cell subassembly web 690 is illustrated in an unrolled condition in plan view (FIG. 6G), and in a cross section view along line D-D' (FIG. 6H). In this implementation, multiple individual CCMs 611A, 611B, 611C are used. The individual CCMs 611A, 611B, 611C include individual electrolyte membranes 610A, 610B, 610C with catalyst layers 612A, 613A, 612B, 613B, 612C, 613C.

The fuel cell subassembly web 690 includes a number of individual first half subgaskets 693A, 693B, 693C, each having an aperture 698A, 698B, 698C through with center portions of the CCMs 611A, 611B, 611C are exposed. Each of the individual first half subgaskets 693A, 693B, 693C include adhesive layers 695A, 695B, 695C disposed on the surfaces 694A, 694B, 694C of the first half subgaskets 693A, 693B, 693C that face the individual CCMs 611A, 611B, 611C. The fuel cell subassembly web 690 includes a second half subgasket web 696, which is a web having a number of apertures 699 through which center portions of the individual CCMs 611A, 611B, 611C are exposed. A substantial portion of the surface 697 of the second half subgasket web 696 that faces the individual CCMs 611A, 611B, 611C is devoid of adhesive.

Figure 6I:
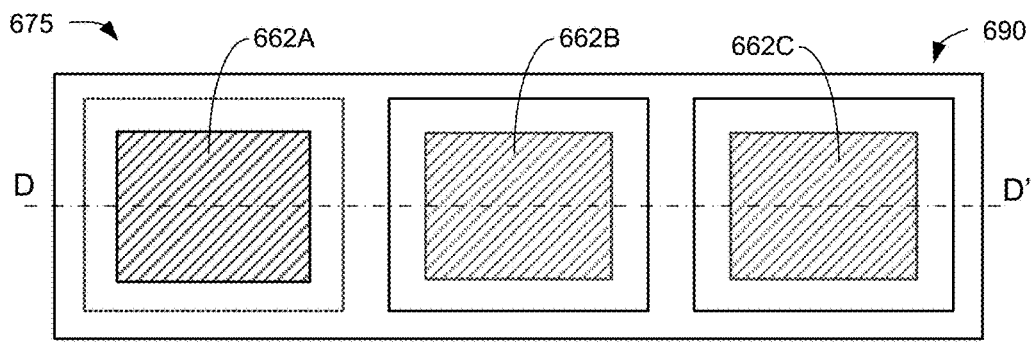
FIGS. 6I and 6J are plan and cross sectional views, respectively, of a five layer MEA web incorporating the fuel cell subassembly web of FIG. 6G.
Figure 6J:
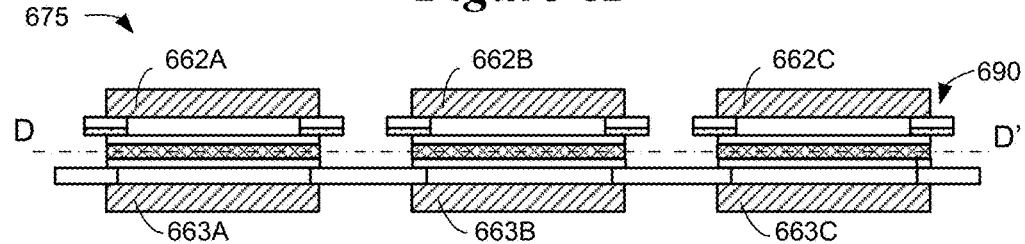

FIGS. 6I and 6J illustrate plan and y direction cross sectional views, respectively, of a five layer MEA web 675 formed by installing GDLs 662A, 663A, 662B, 663B, 662C, 663C on the fuel cell subassembly web 690.

The use of a subgasket with single sided adhesive may be desirable in some applications as previously discussed. In other applications, it may be useful to include a subgasket with adhesive on both subgasket layers used with membranes thrifted in both x and y directions. FIGS. 7A-7J and 8A-8J illustrate fuel cell subassembly webs that include x and y direction membrane thrifting and subgaskets with adhesive on both first and second half subgaskets.

Figure 7A:
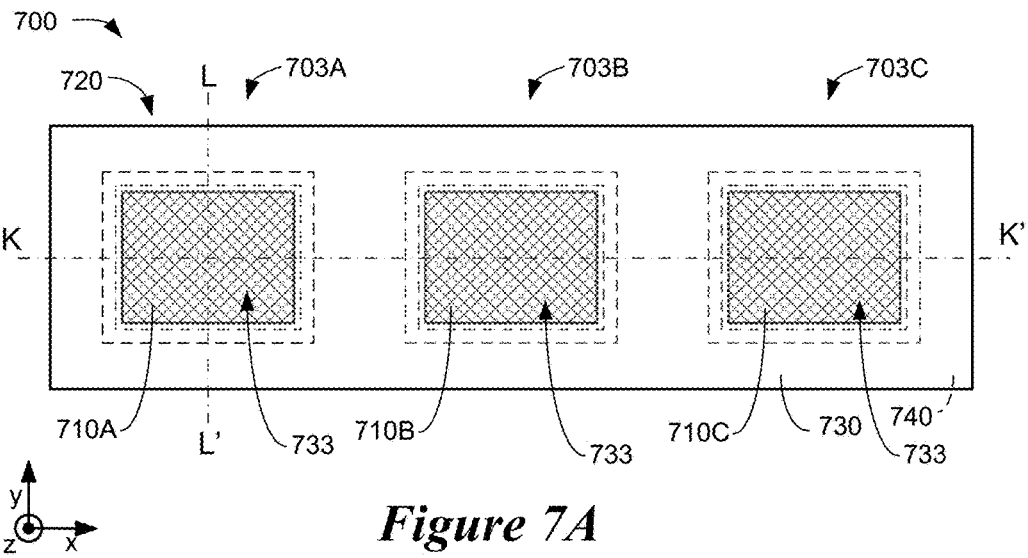
FIGS. 7A-7F illustrate fuel cell subassembly webs that include x and y direction electrolyte membrane thrifting with subgaskets with adhesive on both first and second subgasket layers.
Figure 7B:
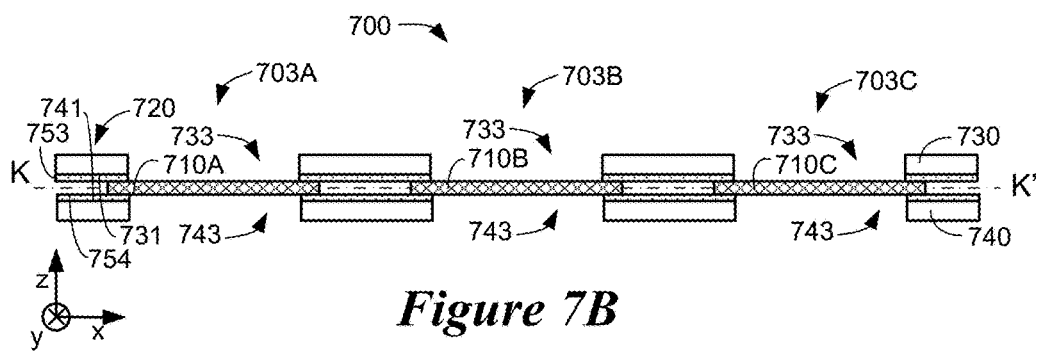
Figure 7C:
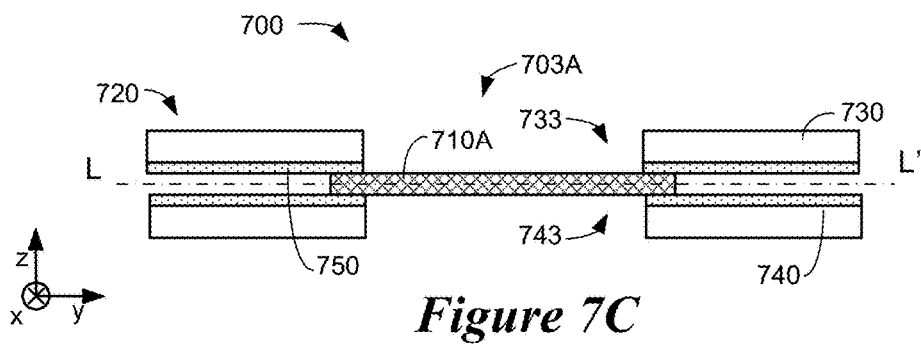
Figure 7D:
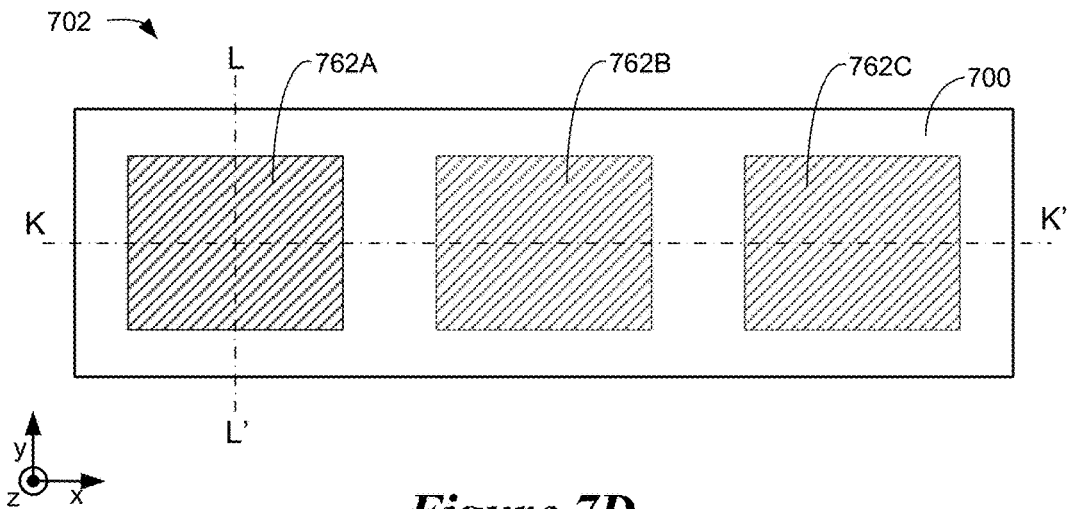
Figure 7E:
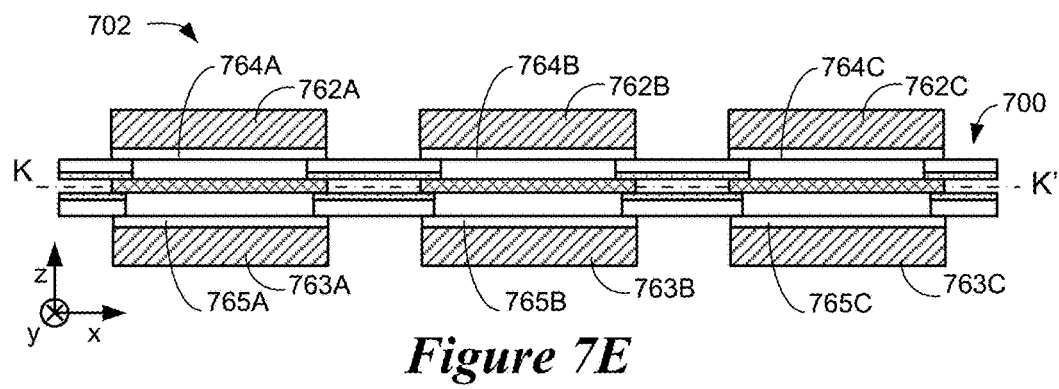
Figure 7F:
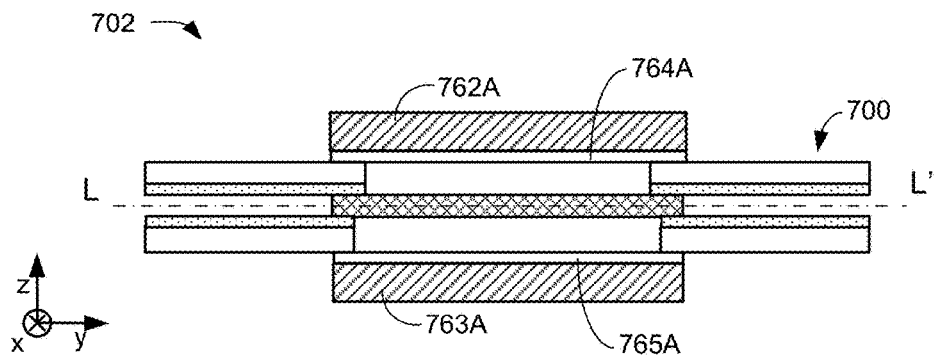

Fuel cell subassembly web 700 and five layer MEA web 702 illustrated in FIGS. 7A-7F comprise many concatenated fuel cell subassemblies, of which subassemblies 703A, 703B, 703C are shown. Fuel cell subassembly web 700 and MEA web 702 are illustrated in an unrolled condition in plan views (FIGS. 7A and 7D, respectively), cross section views along line K-K' (FIGS. 7B and 7E, respectively), and cross section views along line L-L' (FIGS. 7C and 7F, respectively). Fuel cell subassembly web 700 uses multiple individual electrolyte membranes 710A, 710B, 710C. Subgasket 720 comprises first and second half subgasket webs 730, 740. Each of the first and second half subgasket webs 730, 740 have the form of a continuous ladder with apertures 733, 743 through which center portions the individual electrolyte membranes 710A, 710B, 710C are exposed.

Adhesive layer 753 is disposed on surface 731 of first half subgasket web 730 which is oriented toward electrolyte membranes 710A, 710B, 710C. Adhesive layer 754 is disposed on surface 741 of second half subgasket web 740 which is oriented toward electrolyte membranes 710A, 710B, 710C. FIGS. 7D, 7E, and 7F illustrate plan, y direction cross section, and x direction cross section views, respectively of a five layer MEA web 702 formed using the fuel cell subassembly web 700 after installation of catalyst coated GDLs. The catalyst coated GDLs include GDLs 762A, 763A, 762B, 763B, 762C, 763C having catalyst coatings 764A, 765A, 764B, 765B, 764C, 765C.

Figure 7G:
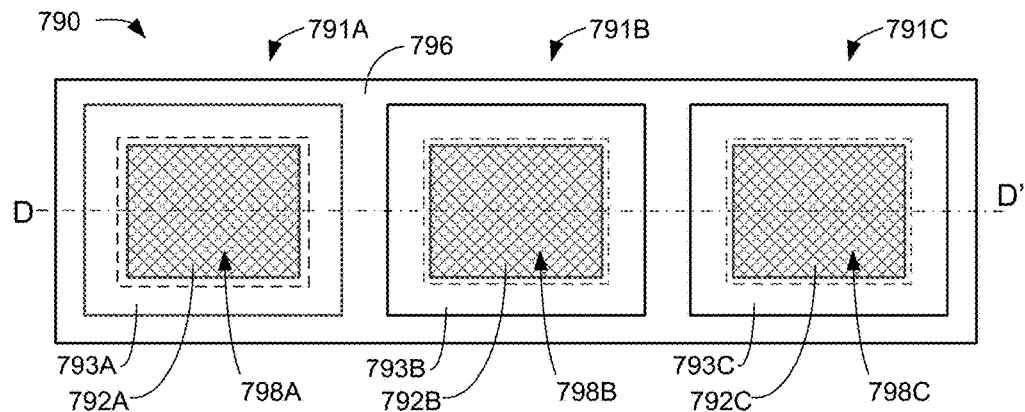
FIGS. 7G and 7H are plan and cross sectional views, respectively, of a fuel cell subassembly web comprising many concatenated fuel cell subassemblies having individual electrolyte membranes, and individual first subgaskets.
Figure 7H:
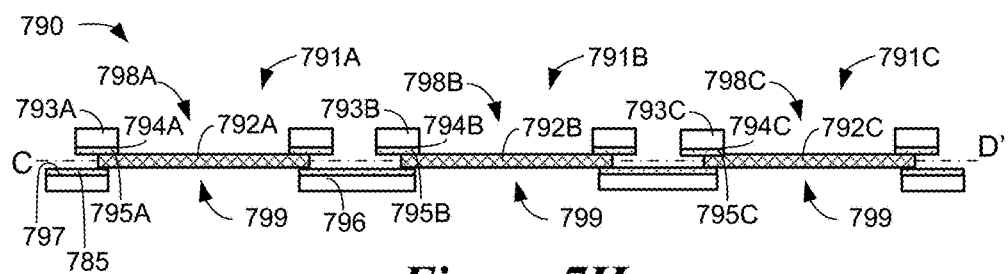

In some embodiments, the first half subgasket web discussed in connection with FIGS. 7A-7F may be replaced by a plurality of individual first subgaskets 793A, 793B, 793C as illustrated in FIGS. 7G and 7H. FIGS. 7G and 7H illustrate a fuel cell subassembly web 790 comprising many concatenated fuel cell subassemblies, of which subassemblies 791A, 791B, 791C are shown. Fuel cell subassembly web 790 is illustrated in an unrolled condition in plan view (FIG. 7G) and cross section view along line D-D' (FIG. 7H). In this implementation, multiple individual electrolyte membranes 792A, 792B, 792C are used. The fuel cell subassembly web 790 includes a number of individual first half subgaskets 793A, 793B, 793C, each having an aperture 798A, 798B, 798C through with center portions of the electrolyte membranes 792A, 792B, 792C are exposed. Each of the individual first half subgaskets 793A, 793B, 793C include adhesive layers 795A, 795B, 795C disposed on the surfaces 794A, 794B, 794C of the first half subgaskets that face the individual electrolyte membranes 792A, 792B, 792C. The fuel cell subassembly web includes a second half subgasket web 796, which includes a number of apertures 799 through which center portions of the electrolyte membranes 792A, 792B, 792C are exposed. There is an adhesive layer 785 disposed on the surface 797 of the second half subgasket web 796 that faces the individual electrolyte membranes 792A, 792B, 792C.

Figure 7I:
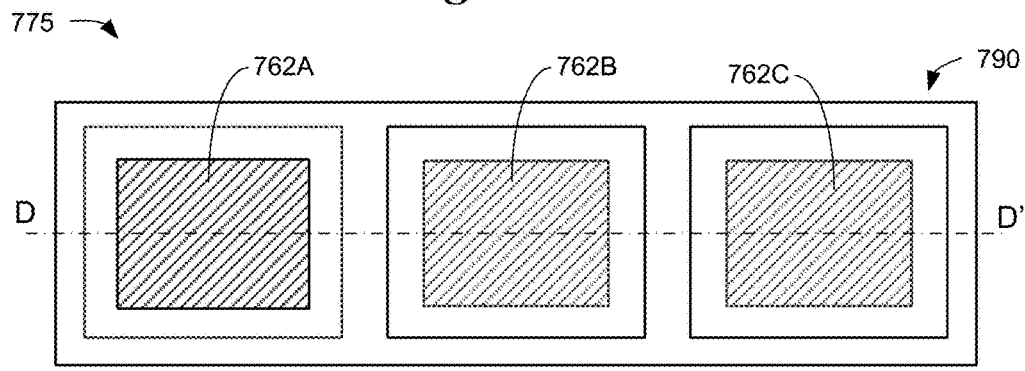
FIGS. 7I and 7J are plan and cross sectional views, respectively, of a five layer MEA web incorporating the fuel cell subassembly web of FIG. 7G.
Figure 7J:
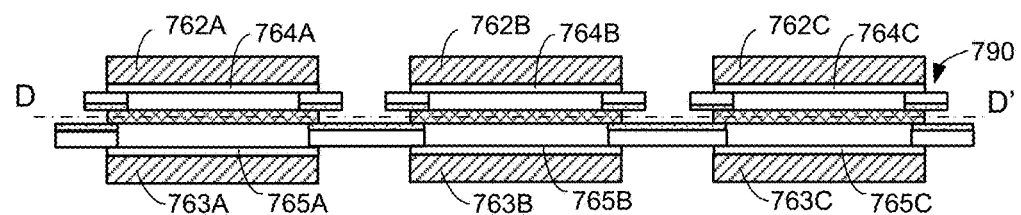

FIGS. 7I and 7J illustrate plan and y direction cross sectional views, respectively, of a five layer MEA web formed by installing catalyst coated GDLs comprising GDLs 762A, 763A, 762B, 763B, 762C, 763C and catalyst coatings 764A, 765A, 764B 765B, 764C, 765C on the fuel cell subassembly web 790.

Figure 8A:
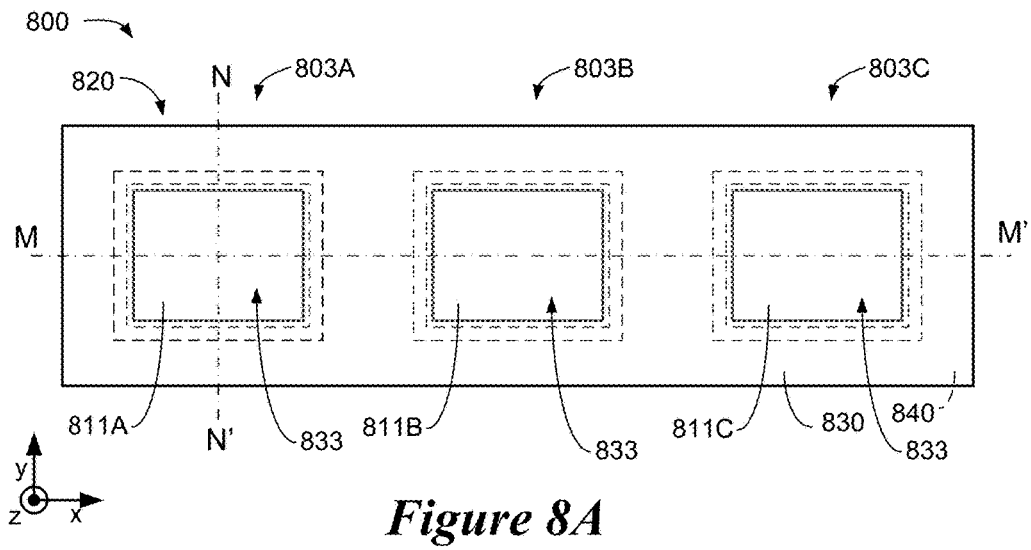
FIGS. 8A-8F illustrate fuel cell subassembly webs that include x and y direction CCM thrifting with subgaskets with adhesive on both first and second subgasket layers.
Figure 8B:
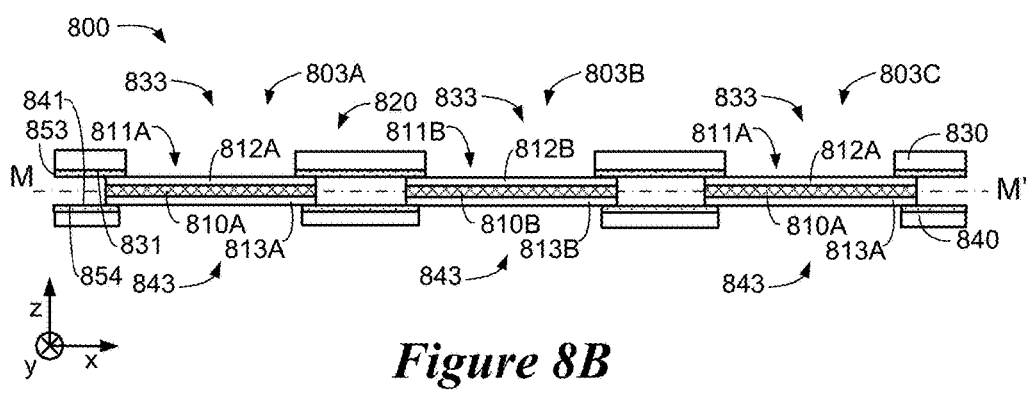
Figure 8C:
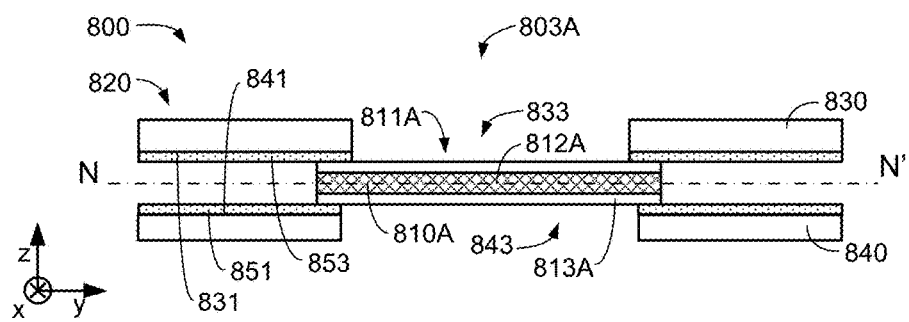
Figure 8D:
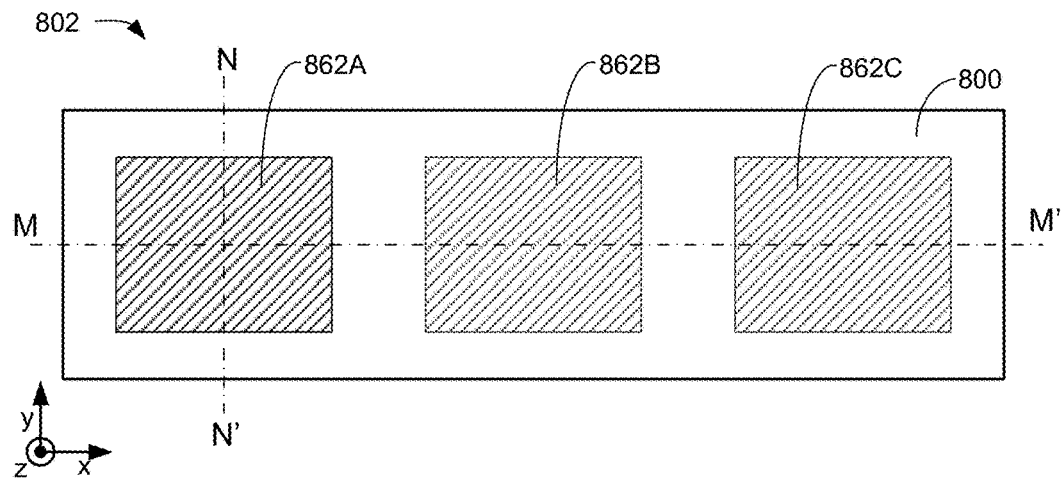
Figure 8E:
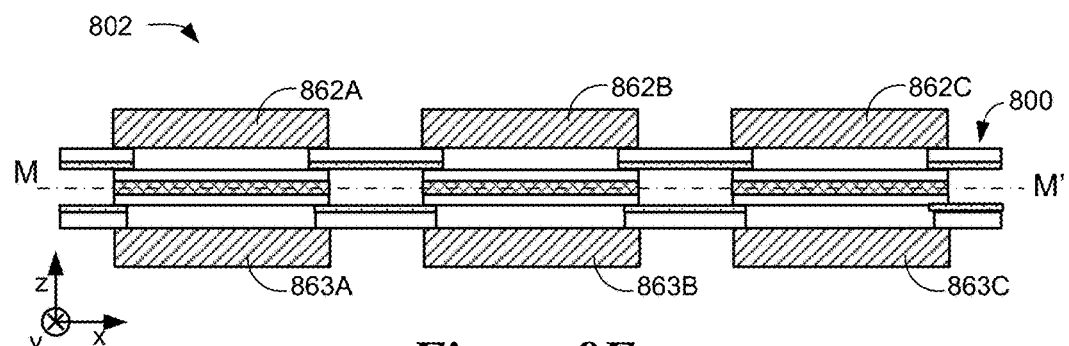
Figure 8F:
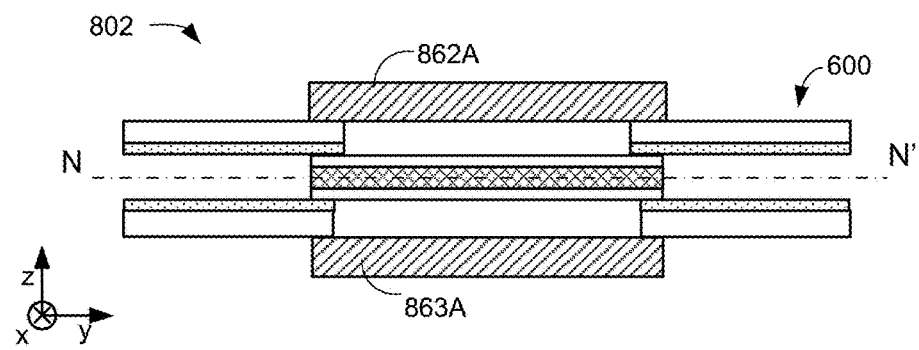

Fuel cell subassembly web 800 illustrated in FIGS. 8A-8F is similar to fuel cell subassembly web 700 except that subassembly web 800 includes individual CCMs rather than individual electrolyte membranes without catalyst coatings as in FIGS. 7A-7F. FIGS. 8A-8C illustrate concatenated fuel cell subassemblies 803A, 803B, 803C. Fuel cell subassembly webs 800, 802 are illustrated in an unrolled condition in plan views (FIGS. 8A and 8D, respectively), cross section views along line M-M' (FIGS. 8B and 8E, respectively), and cross section views along line N-N' (FIGS. 8C and 8F, respectively). In this implementation, multiple individual CCMs 811A, 811B, 811C are used. The individual CCMs 811A, 811B, 811C comprise individual electrolyte membranes 810A, 810B, 810C having catalyst layers 812A, 813A, 812B, 813B, 812C, 813C. Subgasket 820 comprises first and second half subgasket webs 830, 840. Each of the first and second half subgasket webs 830, 840 have the form of a continuous ladder with apertures 833, 843 through which center portions the individual electrolyte membranes 811A, 811B, 811C are exposed.

Adhesive layer 853 is disposed surface 831 of first subgasket web 830 which is oriented toward CCMs 811A, 811B, 811C. Adhesive layer 854 is disposed on surface 841 of second half subgasket web 840 which is oriented toward CCMs 811A, 811B, 811C. FIGS. 8D, 8E, and 8F illustrate a five layer MEA web 802 that includes the fuel cell subassembly web 800 and GDLs 862A, 863A, 862B, 863B, 862C, 863C.

Figure 8G:
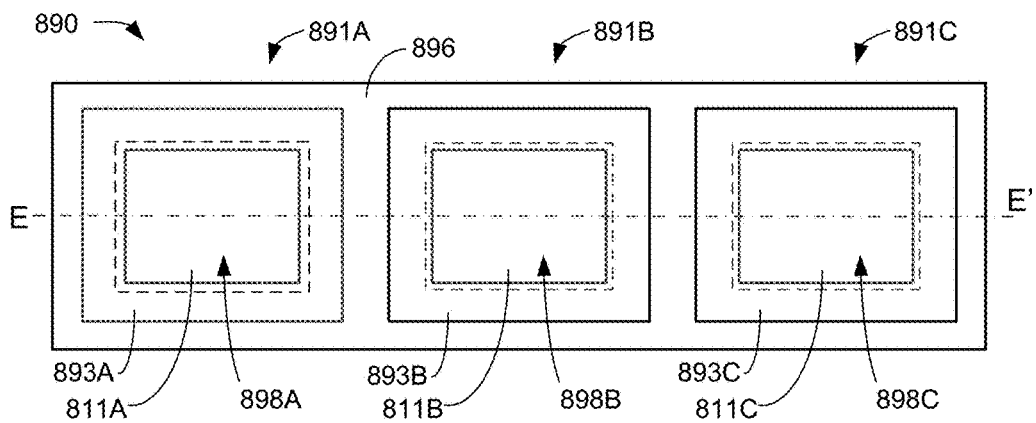
FIGS. 8G and 8H are plan and cross sectional views, respectively, of a fuel cell subassembly web comprising many concatenated fuel cell subassemblies having individual electrolyte membranes, and individual CCMs.
Figure 8H:
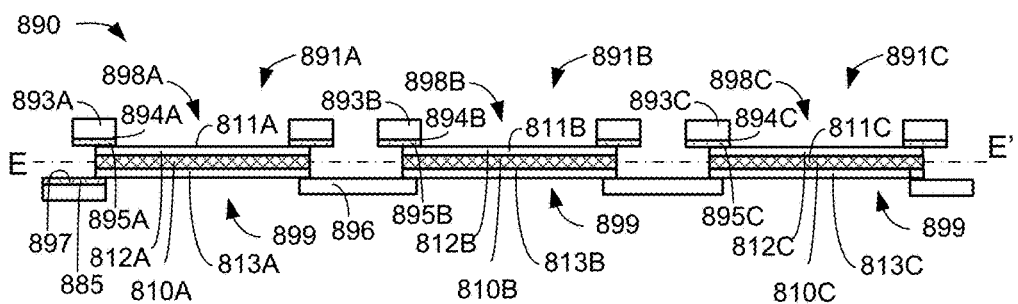

FIGS. 8G and 8H illustrate a fuel cell subassembly web 890 having individual first half subgaskets 893A, 893B, 893C in place of the first half subgasket web illustrated in FIGS. 8A-8F. Fuel cell subassembly web 890 comprises many concatenated fuel cell subassemblies, of which subassemblies 891A, 891B, 891C are shown. Fuel cell subassembly web 890 is illustrated in an unrolled condition in plan view (FIG. 8G), and in a cross section view along line E-E' (FIG. 8H). In this implementation, multiple individual CCMs 811A, 811B, 811C are used. The individual CCMs 811A, 811B, 811C include individual electrolyte membranes 810A, 810B, 810C with catalyst layers 812A, 813A, 812B, 813B, 812C, 813C.

The fuel cell subassembly web 890 includes a number of individual first half subgaskets 893A, 893B, 893C, each having an aperture 898A, 898B, 898C through with center portions of the individual CCMs 811A, 811B, 811C are exposed. Each of the individual first half subgaskets 893A, 893B, 893C include adhesive layers 895A, 895B, 895C disposed on the surfaces 894A, 894B, 894C of the first half subgaskets 893A, 893B, 893C that face the individual electrolyte membranes 811A, 811B, 811C. The fuel cell subassembly web 890 includes a second half subgasket web 896, which has a number of apertures 899 through which center portions of the individual CCMs 811A, 811B, 811C are exposed. The surface 897 of the second half subgasket web 896 that faces the individual CCMs 811A, 811B, 811C includes an adhesive layer 885.

Figure 8I:
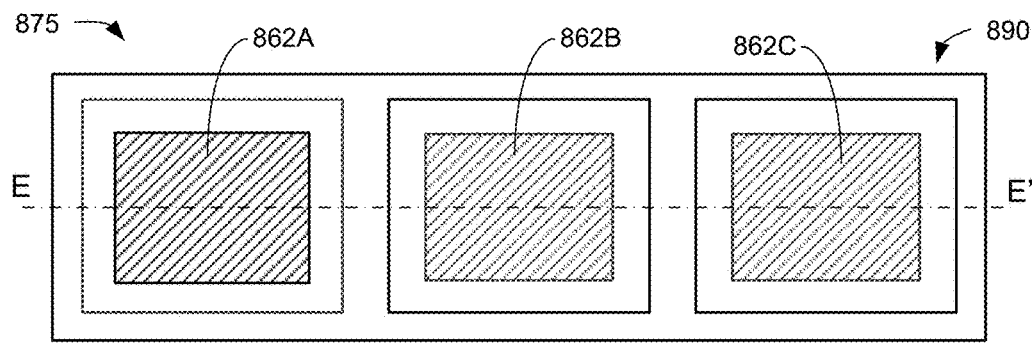
FIGS. 8I and 8J are plan and cross sectional views, respectively, of a five layer MEA web incorporating the fuel cell subassembly web of FIG. 8G.
Figure 8J:
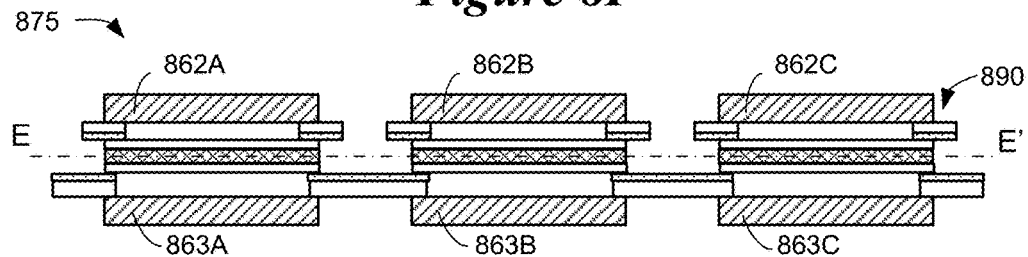

FIGS. 8I and 8J illustrate plan and y direction cross sectional views, respectively, of a five layer MEA web 875 formed by installing GDLs 862A, 863A, 862B, 863B, 862C, 863C on the fuel cell subassembly web 890.

The subgaskets described herein may comprise various types of polymer material, such as polyester, such as polyethylene naphthalate (PEN) or polyethylene telephthalate (PET), polyimide, and/or other similar materials, including rigid polymeric materials that are sufficiently thin, sufficiently strong, and sufficiently compatible with the fuel cell environment, i.e., temperatures of 60-120° C., in the presence of water, hydrogen and/or oxygen. In one example, the subgasket material has a thickness greater than about 0.0125 mm. In one embodiment, the subgasket material is PEN having a thickness of about 0.1 mm. The subgasket can optionally have a gasket or seal adhered to one or both outer surfaces. The gasket material may include microstructured elastomeric ribs, such as thermally cured ethylene propylene diene monomer (EPDM) elastomeric ribs. The first and second half subgaskets need not have identical characteristics. The characteristics of the half subgaskets may be selected to facilitate component handling or fuel cell operation. For example, in certain embodiments, the first half subgasket may have a different thickness from the second half subgasket and/or the first half subgasket may comprise one or more materials that are different from those of the second half subgasket.

The materials of the subgaskets and the adhesive layers are selected so that the adhesive layers adhere well to the subgasket surface. The thickness of the adhesive layer (if used) may be about 0.005 to about 0.05 mm. The adhesive layers may comprise a pressure sensitive adhesive (PSA), a heat activated adhesive, a UV activated adhesive, or other type of adhesive. For example, the adhesive layer may comprise any of the following: acrylic PSA's, rubber based adhesives, ethylene maleic anhydride copolymers, olefin adhesives such as copolymers of 1-octene with ethylene or propylene, nitrile based adhesives, epoxy based adhesives, and urethane based adhesives. In other embodiments, the adhesive layer may comprise a thermally activated adhesive, such as Thermobond 845 (polyethylene maleate based) and Thermobond 583 (nitrile rubber based).

The adhesive may comprise a crosslinked adhesive that has high tack. For example a the adhesive may be an acrylate pressure sensitive adhesive formulated to be hydrolytically stable and creep resistant when compressed in the fuel cell stack. The adhesive and the subgasket layer, e.g., PEN layer, may be rolled up with a release liner and subsequently used to form the subgasketed fuel cell subassemblies described herein.

Any suitable electrolyte membrane may be used in the practice of the present invention. Useful PEM thicknesses range between about 200 μm and about 1 μm. Copolymers of tetrafluoroethylene (TFE) and a co-monomer according to the formula: $FSO_2-CF_2-CF_2-O-CF(CF_3)-CF_2-O-CF=CF_2$ are known and sold in sulfonic acid form, i.e., with the $FSO_2-$ end group hydrolyzed to $HSO_3-$, under the trade name NAFION® by DuPont Chemical Company, Wilmington, Del. NAFION® is commonly used in making polymer electrolyte membranes for use in fuel cells. Copolymers of tetrafluoroethylene (TFE) and a co-monomer according to the formula: $FSO_2-CF_2-CF_2-O-CF=CF_2$ are also known and used in sulfonic acid form, i.e., with the $FSO_2-$ end group hydrolyzed to $HSO_3-$, in making polymer electrolyte membranes for use in fuel cells. Most preferred are copolymers of tetrafluoroethylene (TFE) and $FSO_2-CF_2CF_2CF_2CF_2-O-CF=CF_2$, with the $FSO_2-$ end group hydrolyzed to $HSO_3-$.

In some embodiments, the catalyst layers may comprise Pt or Pt alloys coated onto larger carbon particles by wet chemical methods, such as reduction of chloroplatinc acid. This form of catalyst is dispersed with ionomeric binders and/or solvents to form an ink, paste, or dispersion that is applied either to the membrane, a release liner, or GDL.

In some embodiments, the catalyst layers may comprise nanostructured support elements bearing particles or nanostructured thin films (NSTF) of catalytic material. Nanostructured catalyst layers do not contain carbon particles as supports and therefore may be incorporated into very thin surface layers of the electrolyte membrane forming a dense distribution of catalyst particles. The use of nanostructured thin film (NSTF) catalyst layers allows much higher catalyst utilization than catalyst layers formed by dispersion methods, and offer more resistance to corrosion at high potentials and temperatures due to the absence of carbon supports. In some implementations, the catalyst surface area of a CCM may be further enhanced by using an electrolyte membrane having microstructured features. NSTF catalyst layers comprise elongated nanoscopic particles that may be formed by vacuum deposition of catalyst materials on to acicular nanostructured supports. Nanostructured supports suitable for use in the present invention may comprise whiskers of organic pigment, such as C.I. PIGMENT RED 149 (perylene red). The crystalline whiskers have substantially uniform but not identical cross-sections, and high length-to-width ratios. The nanostructured support whiskers are coated with coating materials suitable for catalysis, and which endow the whiskers with a fine nanoscopic surface structure capable of acting as multiple catalytic sites. In certain implementations, the nanostructured support whiskers may be extended through continued screw dislocation growth. Lengthening the nanostructured support elements allows for an increased surface area for catalysis.

The nanostructured support whiskers are coated with a catalyst material to form a nanostructured thin film catalyst layer. According to one implementation, the catalyst material comprises a metal, such as a platinum group metal. In one embodiment, the catalyst coated nanostructured support elements may be transferred to a surface of an electrolyte membrane to form a catalyst coated membrane. In another embodiment, the catalyst coated nanostructured support elements maybe formed on a GDL surface.

The GDLs can be any material capable of collecting electrical current from the electrode while allowing reactant gasses to pass through, typically a woven or non-woven carbon fiber paper or cloth. The GDLs provide porous access of gaseous reactants and water vapor to the catalyst and membrane, and also collect the electronic current generated in the catalyst layer for powering the external load.

The GDLs may include a microporous layer (MPL) and an electrode backing layer (EBL), where the MPL is disposed between the catalyst layer and the EBL. EBLs may be any suitable electrically conductive porous substrate, such as carbon fiber constructions (e.g., woven and non-woven carbon fiber constructions). Examples of commercially available carbon fiber constructions include trade designated "AvCarb P50" carbon fiber paper from Ballard Material Products, Lowell, Mass.; "Toray" carbon paper which may be obtained from ElectroChem, Inc., Woburn, Mass. EBLs may also be treated to increase or impart hydrophobic properties. For example, EBLs may be treated with highly-fluorinated polymers, such as polytetrafluoroethylene (PTFE) and fluorinated ethylene propylene (FEP).

The carbon fiber constructions of EBLs generally have coarse and porous surfaces, which exhibit low bonding adhesion with catalyst layers. To increase the bonding adhesion, the microporous layer may be coated to the surface of EBLs. This smoothens the coarse and porous surfaces of EBLs, which provides enhanced bonding adhesion with some types of catalyst layers.

Fuel cell subassembly webs, e.g., fuel cell subassembly webs 500, 590, 600, 690, 700, 790, 800, 890 illustrated in FIGS. 5A-5C, 5G, 5H, 6A-6C, 6G, 6H, 7A-7C, 7G, 7H, 8A-8C, 8G, 8H can be made using roll-to-roll manufacturing processes. Installation of GDLs to form 5-layer MEA subassembly webs 502, 575, 602, 675, 702, 775, 802, 875 as illustrated in FIGS. 5D-5F, SI, 5J, 6D-6F. 6I, 6J, 7D-7F, 7I, 7J, 8D-8F, 8I, 8J can also be performed in roll-to-roll processes.

Figure 9:
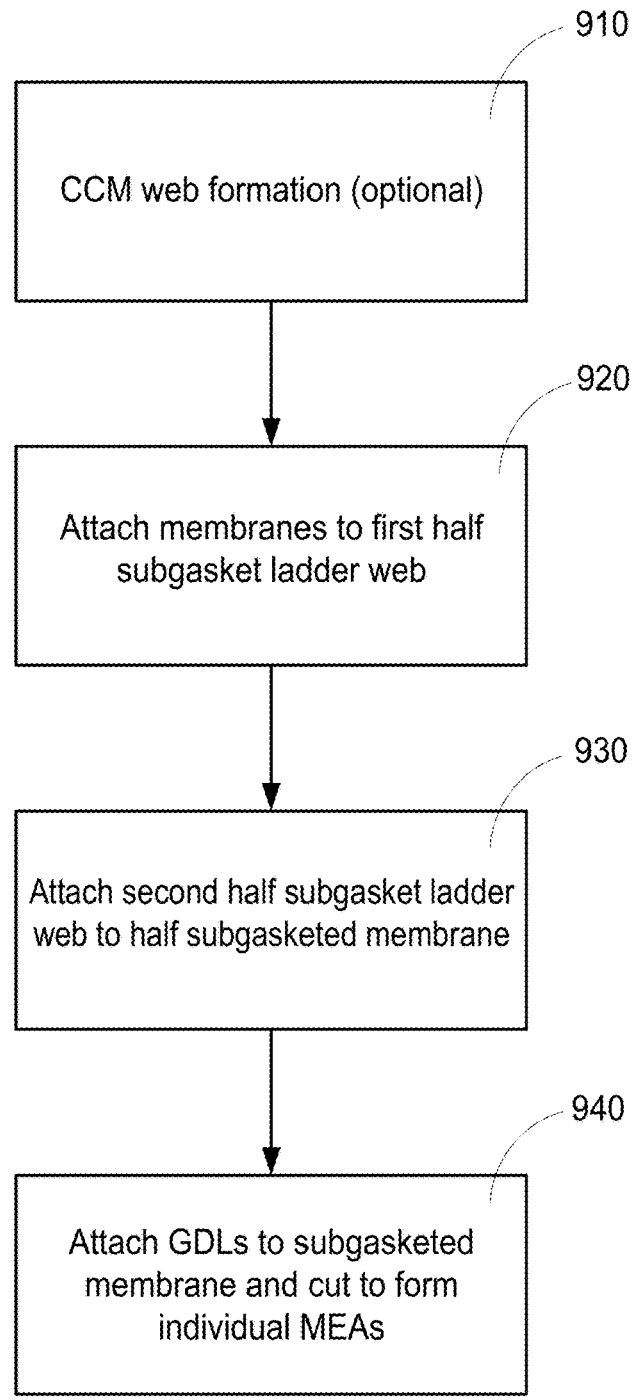
FIG. 9 is a process flow diagram illustrating a process for manufacture of subgasketed fuel cell subassembly webs.

A flow diagram of a roll-to-roll process for manufacture of subgasketed fuel cell subassembly webs, e.g., subgasketed electrolyte membrane webs, subgasketed CCM webs and/or subgasketed five layer MEA webs is illustrated in FIG. 9. FIG. 9 illustrates the manufacture of a five layer MEA web that incorporates a CCM. It will be appreciated that a similar process may be used to form a five layer MEA subassembly webs using catalyst coated GDLs rather than CCMs.

Optionally, a continuous CCM web is formed 910 by lamination of anode and cathode catalysts to an electrolyte membrane. If an electrolyte membrane web without catalyst coating is used with catalyst coated GDLs to form the MEA, this part of the process may be eliminated. The membrane web is cut into individual membranes which are adhered 920 to a first adhesive layer disposed on a first half subgasket ladder web. Lamination of the individual membranes to the first half subgasket ladder web forms a half gasketed web with individual electrolyte membranes. A second half subgasket ladder web with little or no adhesive disposed on the surface oriented toward the electrolyte membranes is attached 930 to the half subgasketed individual membrane web. The second half subgasket ladder web is adhered the half subgasketed web by the adhesive layer disposed on the first half subgasket web. Optionally, GDLs are attached 940 to the subgasketed membrane web to form a five layer MEA web. If the subgasketed membrane web is not a CCM web then the GDLs include catalyst layers. The five layer MEA web may be cut to form individual five layer MEAs.

FIGS. 10A-10D illustrate various subsystems of a roll-to-roll based system configured to produce x and y thrifted fuel cell subassemblies including half subgasketed individual membrane webs, fully subgasketed individual membrane webs, individual subgasketed membranes, five layer MEA webs, individual five layer MEAs, and various intermediate fuel cell subassemblies. The fuel cell subassemblies, e.g., full or half subgasketed webs having multiple individual electrolyte membranes or CCMs and/or five layer MEA webs, may be produced as roll goods as illustrated by FIG. 4. A roll-to-roll based system is configured to implement at least some processes using a roll-based approach, but not every subsystem needs to be roll-based and/or not all input components, output components, and/or intermediate components need to be wound onto rolls and/or unwound from rolls. In connection with the manufacturing processes illustrated in FIGS. 10A-10D, some x direction (down web) cross sections of input, intermediate, and/or output subassembly webs or subassemblies are shown in FIGS. 11A-11N to assist in understanding the structure of the intermediate subassembly webs or subassemblies.

Figure 10A:
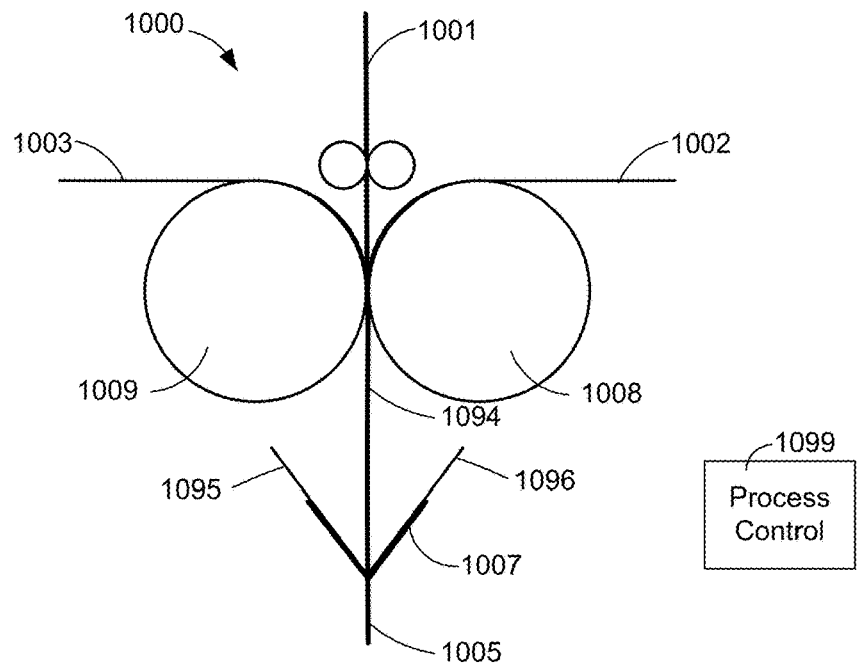
FIGS. 10A-10E illustrate various subsystems of a roll-to-roll based system configured to produce x and y thrifted fuel cell subassemblies including subgasketed membrane webs, individual subgasketed membranes, five layer MEA webs, individual five layer MEAs, and various intermediate fuel cell subassemblies
Figure 10B:
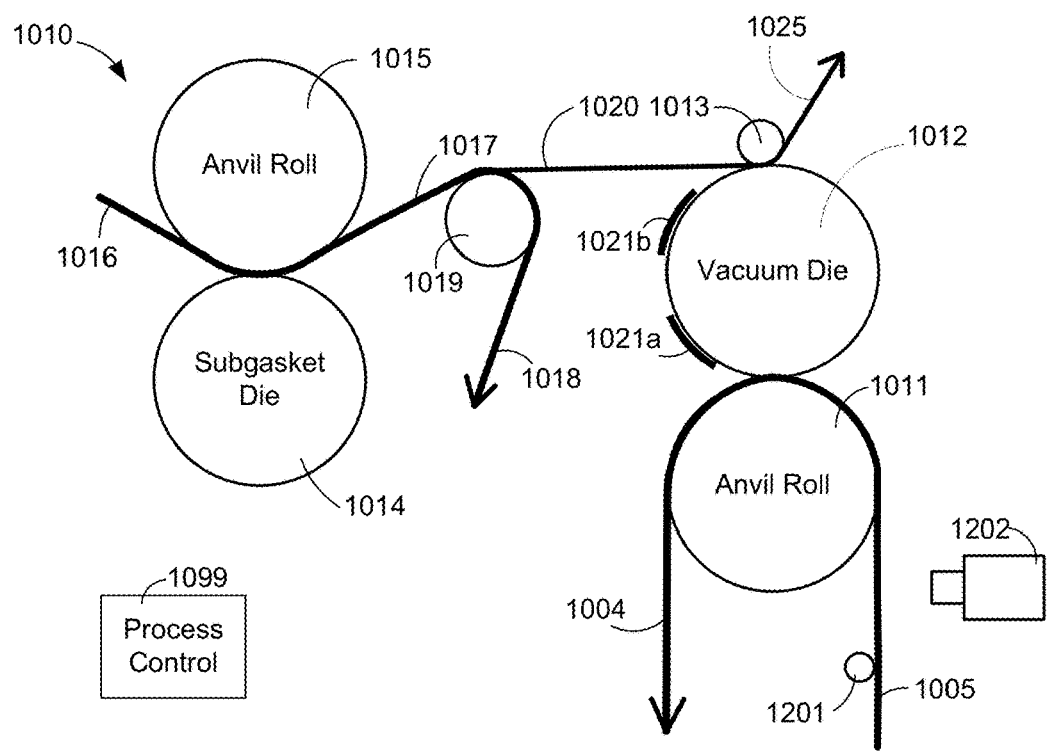
Figure 11A:
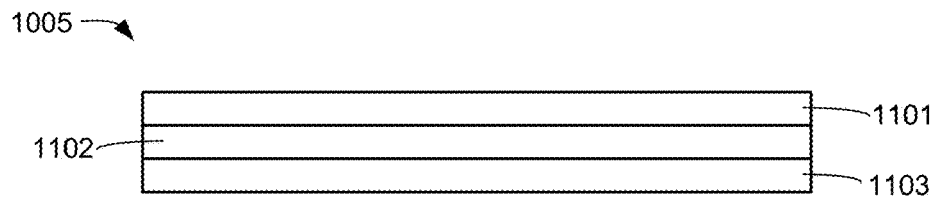
FIGS. 11A-11N are x direction (down web) cross sections of input, intermediate, and/or output subassembly webs or subassemblies produces by the subsystems of FIGS. 10A-10E.

FIG. 10A illustrates a subsystem 1000 configured to produce a CCM web 1005. Cathode and anode catalyst layers 1002, 1003, which are deposited or coated onto temporary carrier webs are laminated onto an electrolyte membrane web 1001 by lamination rolls 1008 and 1009. The carrier webs 1095, 1096 are peeled away, e.g., by duck bill peeler 1007 to form CCM web 1005. A cross sectional diagram of the CCM web 1005 is shown in FIG. 11A. The CCM web 1005 includes the electrolyte membrane 1102 with an anode catalyst 1101 disposed on one surface of the electrolyte membrane 1102 and a cathode catalyst 1103 disposed on the opposite surface of the electrolyte membrane 1102. The CCM web 1005 produced by subsystem 1000 is input to subsystem 1010 illustrated in FIG. 10B for attachment of the first half subgasket. Alternatively an electrolyte web without catalyst layers is input to subsystem 1010.

Figure 13A:
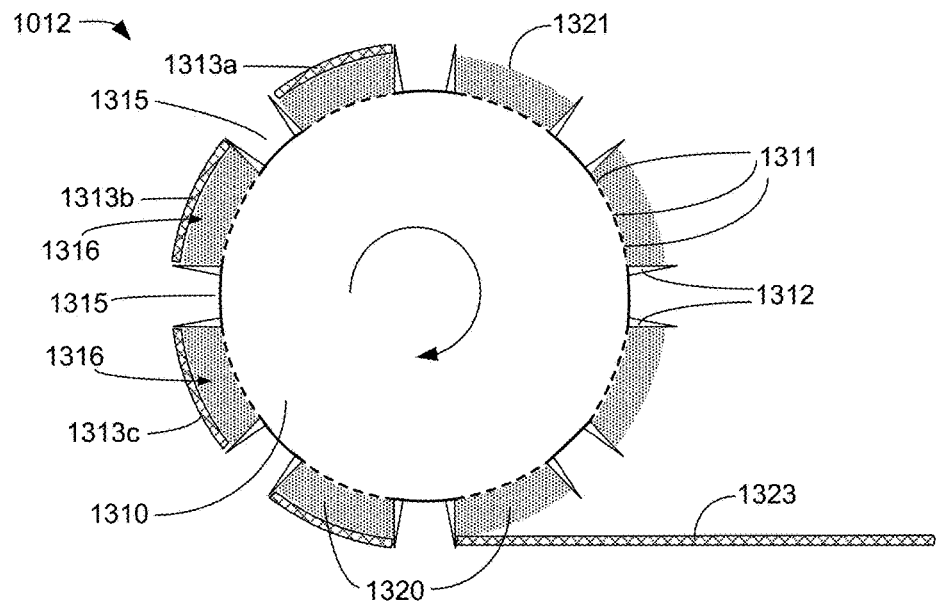
FIG. 13A is a cross sectional diagram of a foamed vacuum die roller.
Figure 13B:
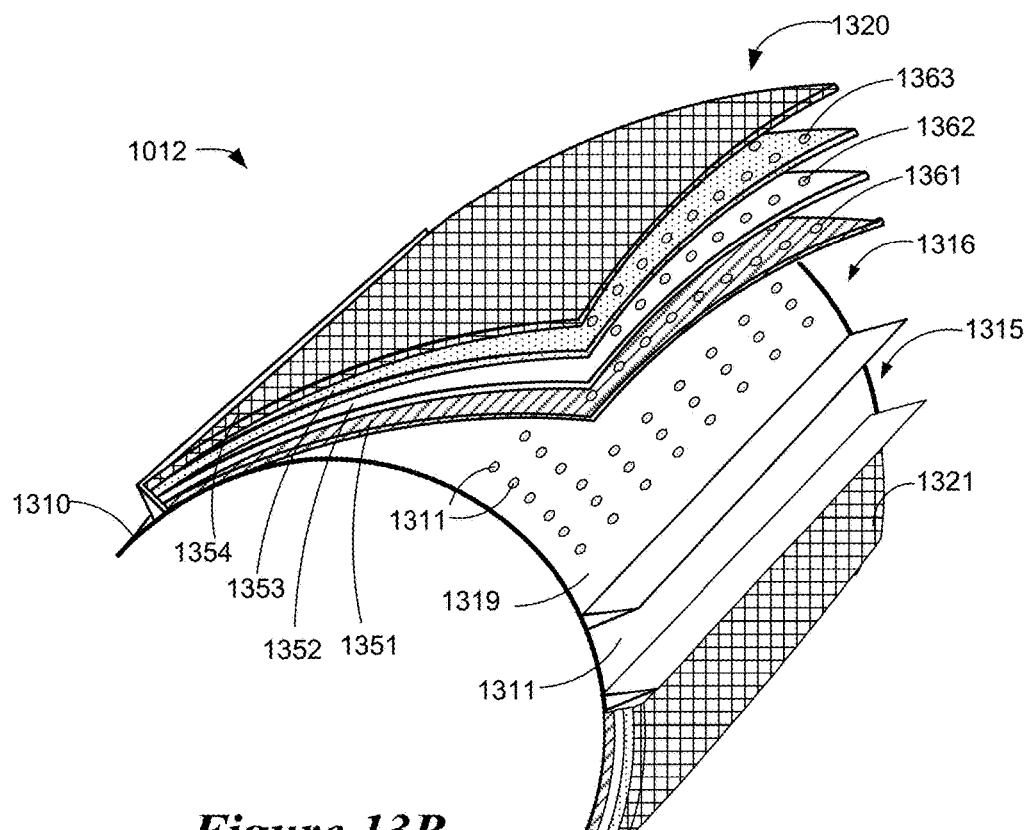
FIG. 13B an embodiment of a foamed vacuum die roller and a process for making a the foamed vacuum die roller.

The subsystem 1010 uses an anvil roll 1011 and a foamed vacuum die 1012 to cut the membrane web 1005 (or electrode membrane without catalyst) into individual membranes 1021a, 1021b. The membrane web 1005 is cut into individual membranes 1021a, 1021b as it passes between the anvil roll 1011 and a foamed vacuum die 1012. A more detailed view of the foamed vacuum die 1012 is illustrated in FIGS. 13A and 13B.

Figure 12A:
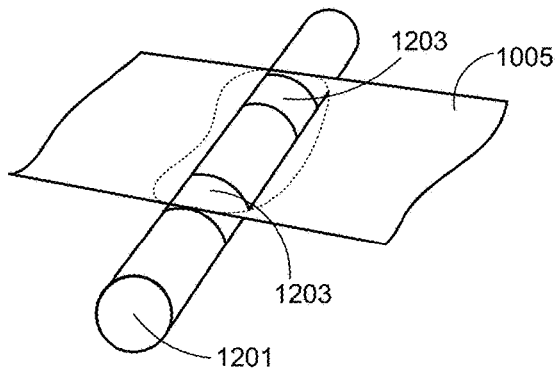
FIGS. 12A and 12B illustrate optional subsystems for pre-treating electrolyte membranes.
Figure 12B:
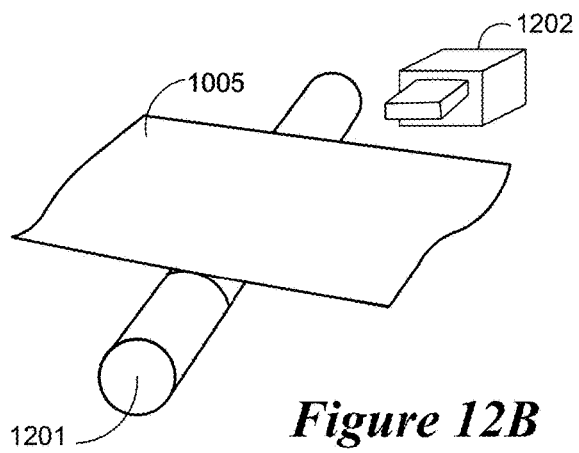

Prior to cutting, the membrane web may optionally be pre-treated to present the membrane web 1005 to the die 1012 in a condition that achieves more uniform cutting. Membrane pre-treatment options are illustrated in FIGS. 12A and 12B. For example, one pre-treatment operation (FIG. 12A) involves the use of a pre-treatment roller 1201 with bumpers 1203, which may be formed by a wrap of tape or similar method, on either side of the pre-treatment roller 1201. The operation of the pre-treatment roller 1201 with bumpers 1203 is to slightly spread the membrane web 1005 prior to the cutting operation to achieve a more repeatable cut. Alternatively, or additionally, as illustrated in FIG. 12B, the membrane web 1005 may be heated slightly, e.g., by a forced air heater or other type of heater 1202, to reduce moisture and/or to slightly shrink the membrane web 1005 prior to the cutting operation.

Figure 11B:
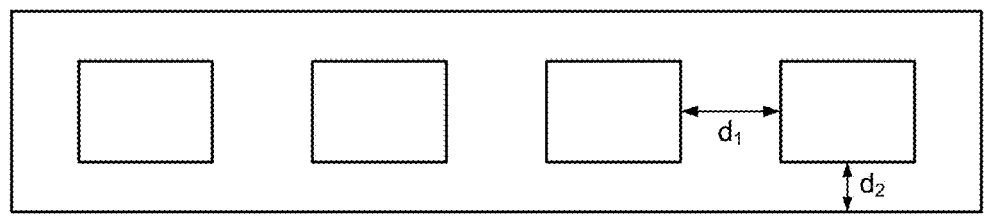

The scrap membrane ladder 1004 from the membrane cutting process is discarded. A plan view of the scrap membrane ladder 1004 is shown in FIG. 11B. To achieve cost reductions by reducing utilization of membrane material, the vacuum die 1012 can be configured and the cutting process controlled so that the thickness of the rungs, $d_1$, and/or sides, $d_2$, of the scrap membrane ladder 1004 may be less than ⅛ inches or may be even be reduced to 0 inches in some implementations with careful control of the cutting process. The individual membranes 1021a, 1021b are held on die 1012 by vacuum as it rotates towards the lamination roller 1013.

Figure 11C:
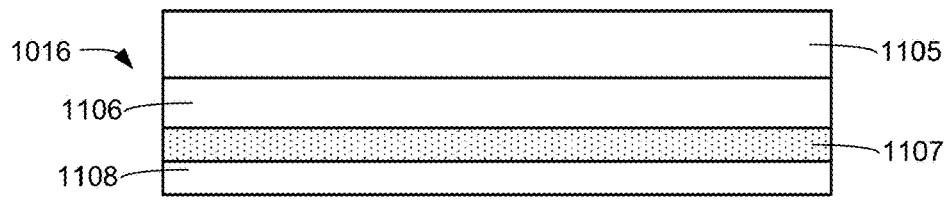

As illustrated by the cross section diagram of FIG. 11C, a first half subgasket web 1016 includes a first subgasket layer 1106 and an adhesive layer 1107 with a release liner 1108. The first half subgasket web 1016 is input to the subsystem 1010 on a carrier web 1105, e.g., a carrier web having a repositionable adhesive. In some implementations, a vacuum belt could be used to transport the first half subgasket web (including the carrier web) to subsystem 1010. The carrier web with repositionable adhesive serves to support and stabilize the first half subgasket web 1016. The repositionable carrier web is a web including an adhesive with adhesive tack properties sufficiently low so that the carrier web can be easily removed from the first half subgasket web (or other work product) and the adhesive stays on the carrier web. In some implementations, the carrier web is a 1 mil plastic or paper film with a 0.5 mil low tack adhesive on the surface of the film.

Figure 11D:
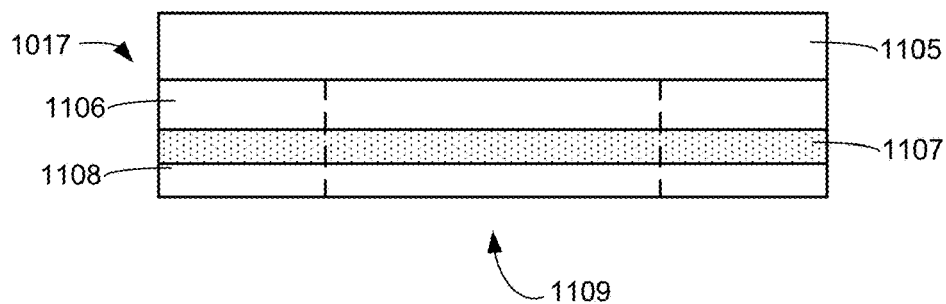

Returning to FIG. 10B, as the first half subgasket web 1016 moves between the anvil roll 1015 and subgasket die roll 1014 the die roll 1014 makes aperture cuts in the first subgasket web 1016 that define the first subgasket web apertures while leaving the carrier web intact. The first half subgasket material, adhesive, and adhesive release liner is initially retained in the apertures as aperture slugs. A cross section of the first subgasket web 1017 after the cutting operation which produces the retained aperture slugs 1109 is shown in FIG. 11D. The aperture slugs 1109 (cutout subgasket material, adhesive, and adhesive liner remaining in the subgasket apertures) are initially left in place, but are eventually removed to reveal the apertures of the first half subgasket web.

Figure 11E:
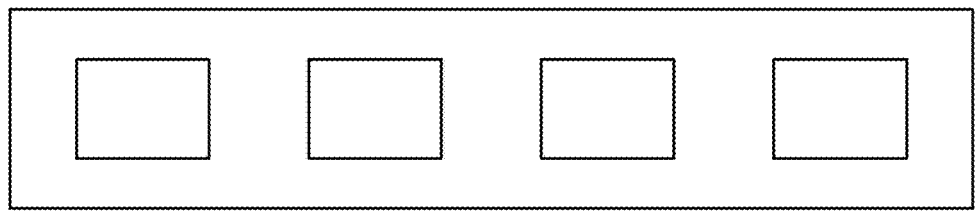
Figure 11F:
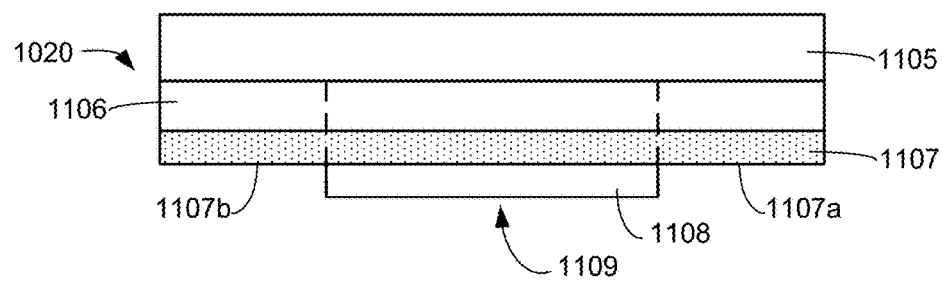

The adhesive release liner ladder 1018 is removed at roller 1019, leaving the first half subgasket web (with the aperture slugs intact minus the adhesive release liner ladder) 1020 on the carrier web. The adhesive release liner ladder 1018 is shown in plan view in FIG. 11E. A cross section of the first half subgasket web 1020 with the aperture slug 1109 intact minus the adhesive release liner ladder 1018 is shown in FIG. 11F. The first half subgasket web 1020 is on carrier web 1105 and includes the first half subgasket layer 1106 and adhesive layer 1107. A portion of the adhesive liner 1108 remains on the adhesive layer 1107. Portions of the surface 1107a, 1107b of the adhesive layer 1107 are exposed. As illustrated in FIG. 11F, a portion of the adhesive release liner 1108 is retained on the adhesive layer 1107 in the region of the aperture slugs 1109. The individual membranes 1021a, 1021b and the first half subgasket web (with the aperture slugs intact minus the adhesive release liner ladder) 1020 are brought together at the lamination roll 1013.

The foamed vacuum die 1012 (as illustrated in more detail in FIGS. 13A and 13B) includes a porous, compliant material, e.g., foam, in the die cavities of the die 1012 to hold and protect the membranes from damage during the manufacturing process. During the attachment of the to the individual membranes 1021a, 1021b to the subgasket web 1021, it is desirable that no foam is present on the foamed vacuum die 1012 in the gaps (see 1315, FIG. 13) between the die cavities. The absence of material on the die in the gaps 1315 allows the first half subgasket web 1020 to advance through nip of 1013, 1012 while the foamed vacuum die 1012 and anvil roll 1011 are stopped when the gap between apertures in the subgasket web 1020 is aligned with lamination roll 1013. The foamed vacuum die 1012 resumes line speed when an individual membrane is registered to the aperture in the subgasket web 1020. A process control module 1099 includes one or more sensors and circuitry configured to control the operation of subsystems illustrated in FIGS. 10A-10E. For example, the process control module 1099 may include sensors and circuitry configured to adjust the speed of one process relative to the speed of another process and/or to control the down web position of one or more webs used in fabrication of the fuel cell subassemblies. Further, the process control module 1099 may include sensors and circuitry to control the cross web position of one or more webs. Down web and/or cross web position control facilitates proper alignment of fuel cell subassembly webs and/or components.

A sensor on the subgasket die 1014 is used to start or stop the foamed vacuum die 1012 that cuts the individual membranes 1021a, 1021b to control the alignment of the individual membranes 1021a, 1021b in relation to the aperture cuts in the first subgasket web 1020 at lamination roller 1013. The pressure sensitive adhesive on the first subgasket web 1020, which is exposed by removal of the release liner ladder 1018, adheres the first subgasket web 1020 to the individual membranes 1021a, 1021b to form a half subgasketed membrane web 1025. At this stage, the half subgasketed membrane web 1025 retains the aperture slugs. The individual membranes 1021a, 1021b are adhered to the first subgasket web 1020 at the perimeter surface regions of the individual membranes 1021a, 1021b with the center surface regions of the individual membranes 1021a, 1021b being protected from the adhesive by the adhesive release liner of the aperture slugs.

Figure 11G:
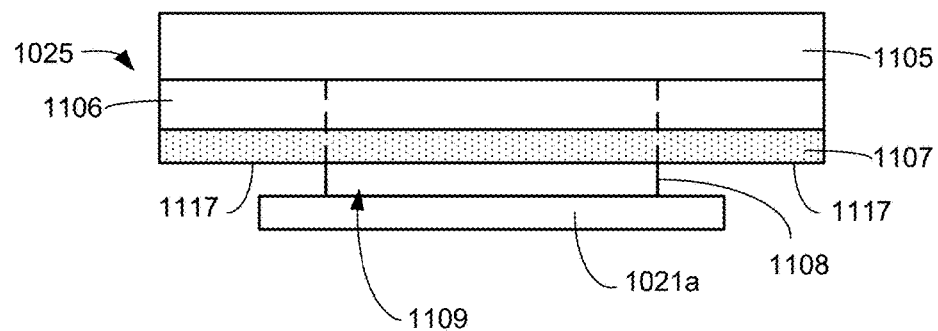

A cross section of the half subgasketed membrane web (with the aperture slugs retained) 1025 on the carrier web 1105 is shown in FIG. 11G. The half subgasketed membrane web 1025 includes the first subgasket layer 1106 and adhesive layer 1107. A portion of the adhesive liner 1108 remains on the adhesive 1107. Portions of the surface 1117 of the adhesive layer 1107 are now attached to the membrane 1021a. At this stage of the process, the aperture slugs 1109 are retained.

Figure 10C:
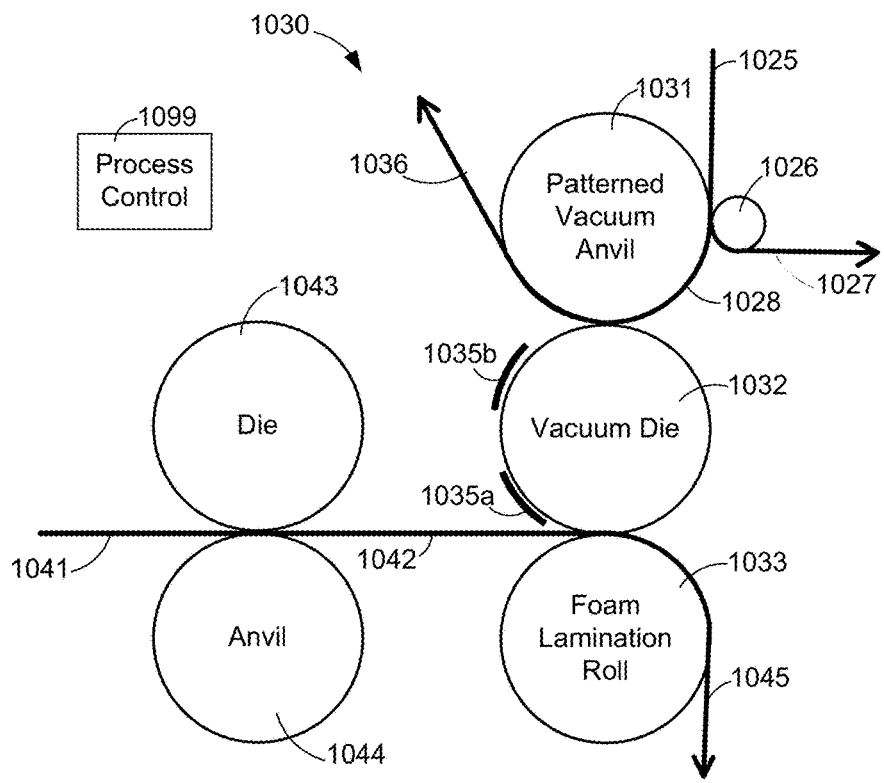

FIG. 10C illustrates a subsystem 1030 configured to cut the half subgasketed membrane web 1025 into individual half subgasketed membranes and to attach the second subgasket web to the individual half subgasketed membranes. The process of subsystem 1030 can be used to produce subgasketed membranes with the second subgasket frame having a larger size than first subgasket frame after cutting the subgasketed membrane web into individual subgasketed membranes.

Figure 11H:
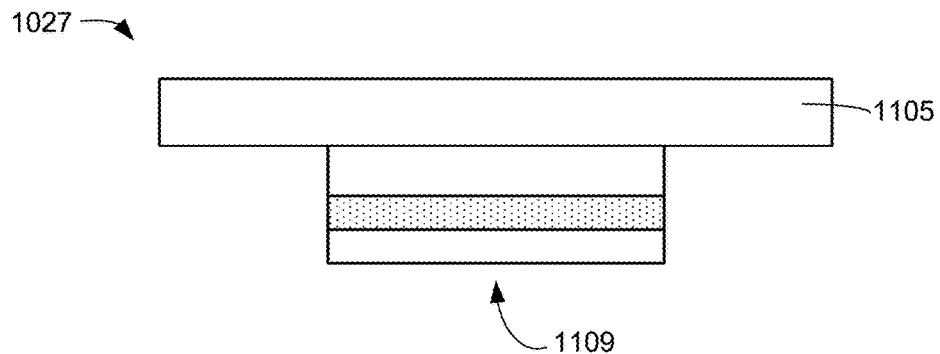
Figure 11I:
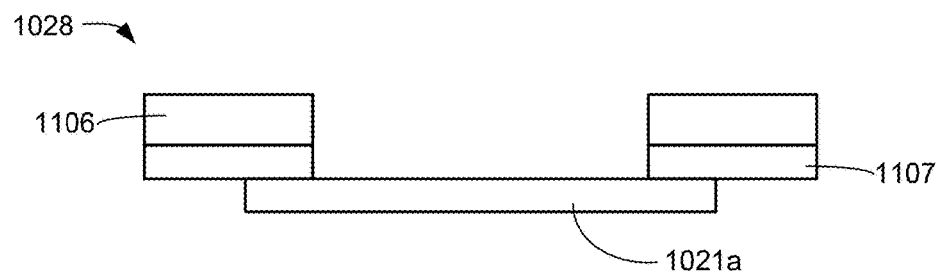
Figure 11J:
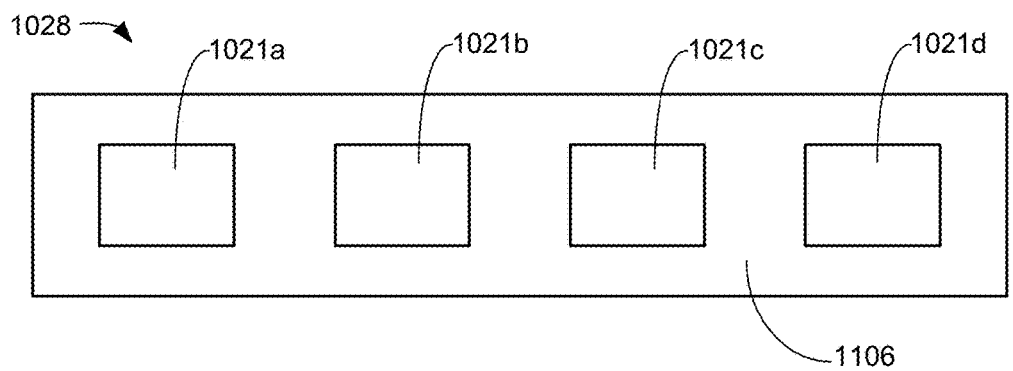

The half subgasketed membrane web (with the aperture slugs retained) 1025 is input to subsystem 1030. The aperture slugs 1109 and repositionable carrier web 1105 are removed at roller 1026 leaving a half subgasketed membrane web 1028. Cross sectional views of the aperture slugs 1109 and repositionable carrier web 1105 (referred to together as 1027) and the half subgasketed membrane web 1028 are illustrated in FIGS. 11H and 11I, respectively. Removal of the aperture slugs 1109 and carrier web 1105 (referred to together as 1027) shown in FIG. 11H leaves a half subgasketed membrane web 1028. The half subgasketed membrane web 1028 is illustrated by the cross sectional view of FIG. 11I and the plan view of FIG. 11J. The half subgasketed membrane web 1028 comprises multiple individual membranes (1021a shown in FIGS. 11I and 1021a-1021d shown in FIG. 11J) held together by the ladder structure of the first subgasket ladder web 1106 which is adhered to the perimeter surface regions of the individual membranes 1021a-1021d by the adhesive 1107.

Individual half subgasketed membranes 1035 are cut out of the half subgasketed membrane web 1028 as the half subgasketed membrane web 1028 passes between the patterned anvil roll 1031 and vacuum die 1032. The scrap subgasket ladder 1036 left over from the cut is discarded. The individual half subgasketed membranes 1035a, 1035b are carried by the vacuum die 1032 to foam lamination roll 1033.

The second half subgasket web 1041 (without an adhesive layer) is input to subsystem 1030 on a second carrier web, e.g., a carrier web having a repositionable adhesive. A cross section of the second half subgasket web 1041 and carrier web 1110 is illustrated in the cross sectional diagram, FIG. 11K. Aperture cuts are made in the second gasket web 1041 as it passes between die and anvil rollers 1043, 1044 forming aperture slugs. The cut portions of the second half gasket material forming the aperture slugs are left in place on the second carrier web 1110. A cross section of the second subgasket web 1042 (with the aperture slugs 1111 in place) on the carrier web 1110 is illustrated in the cross sectional diagram of FIG. 11L.

The second half subgasket web 1042 is laminated to the individual half subgasketed membranes 1035 at lamination roller 1033 to form a fully subgasketed membrane web 1045 disposed on the second carrier web. A cross section of the fully subgasketed membrane web 1045 on the carrier web 1110 is illustrated in FIG. 11M. The fully subgasketed membrane web 1045 includes the second half subgasket web 1041 with the aperture slugs 1111 intact. The individual half subgasketed membrane webs 1035 including the individual membranes 1021a are adhered to the second half subgasket web 1041 by the adhesive layer 1107a which is disposed on the individual first half subgasket 1106a. The second carrier web 1110 and aperture slugs 1111 are removed to reveal a subgasketed individual membrane web. The subgasketed individual membrane web includes thrifted individual electrolyte membranes subgasketed with individual first half subgaskets and a second half subgasket web. The individual first half subgaskets are adhered to the second half subgasket web and to the individual membranes by an adhesive layer disposed on the individual first half subgaskets. The second half subgasket web may have little or no adhesive on the surface facing the electrolyte membrane. The process of subsystem 1030 can be used to produce a subgasketed membrane with the second subgasket frame larger than the first subgasket frame after cutting the subgasketed membrane web into individual subgasketed membranes. One individual subgasketed membrane 1049a is illustrated by the cross sectional diagram of FIG. 11N. The individual subgasketed membrane 1049a includes membrane 1021a, first half subgasket 1106a having adhesive layer 1107a and second half subgasket 1041a having no adhesive layer. Note that the first and second half subgaskets 1106a, 1041a are not necessarily the same size, e.g., the first half subgasket 1106a may be smaller than the second half subgasket 1041a as depicted in FIG. 11N.

Figure 10D:
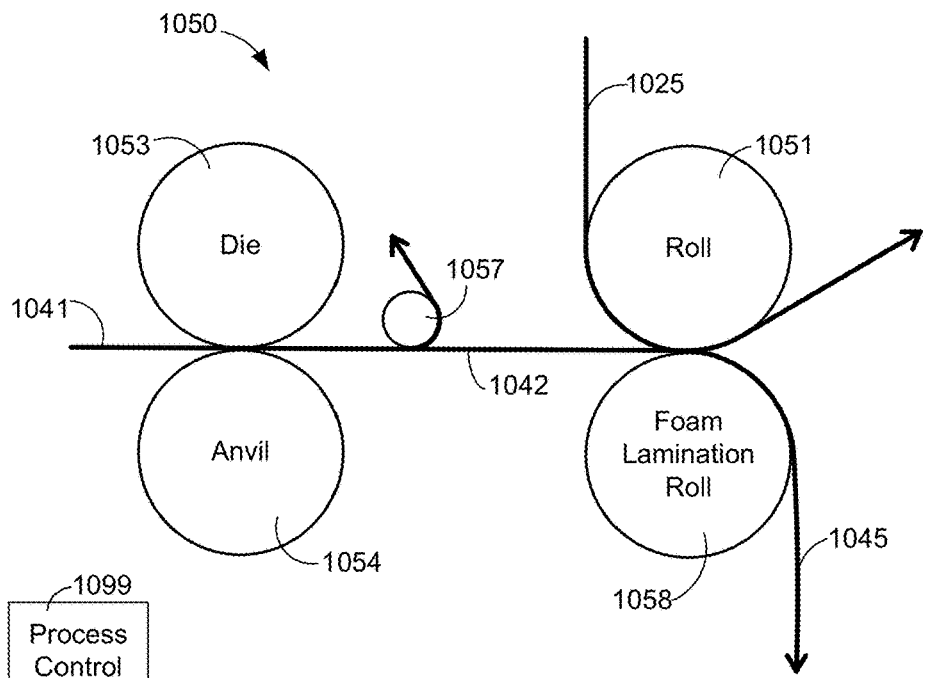
Figure 11K:
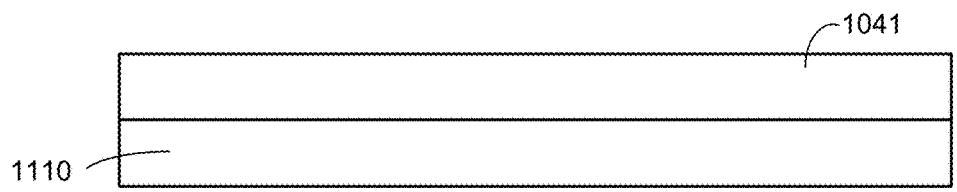

FIG. 10D illustrates an alternate subsystem 1050 configured to register and attach subgasketed membrane web 1025 illustrated by FIG. 11G to half subgasketed web 1042 illustrated in FIG. 11K. The subsystem 1050 of FIG. 10D can be used in place of the subsystem 1030 of FIG. 10C, for example. The process of subsystem 1050 can be used to produce a subgasketed membrane with the second subgasket outer perimeter the same size as the first subgasket outer perimeter after cutting the subgasketed membrane web into individual subgasketed membranes.

The half subgasketed membrane web (with the aperture slugs intact) 1025 (illustrated in the cross section of FIG. 11G) is input to subsystem 1050. The aperture slugs and repositionable carrier web 1027 are removed at roller 1051. A cross sectional view of the aperture slugs and repositionable carrier web 1027 is illustrated in FIG. 11H.

Figure 11L:
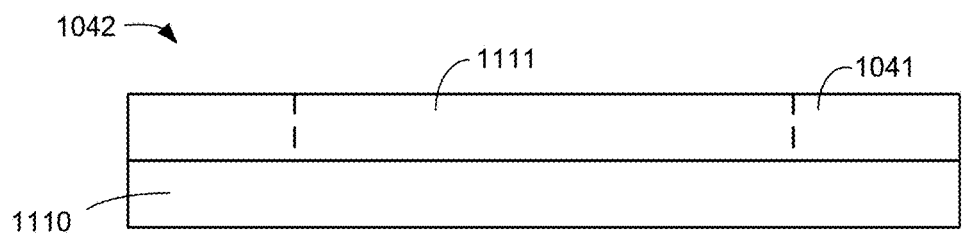
Figure 11M:
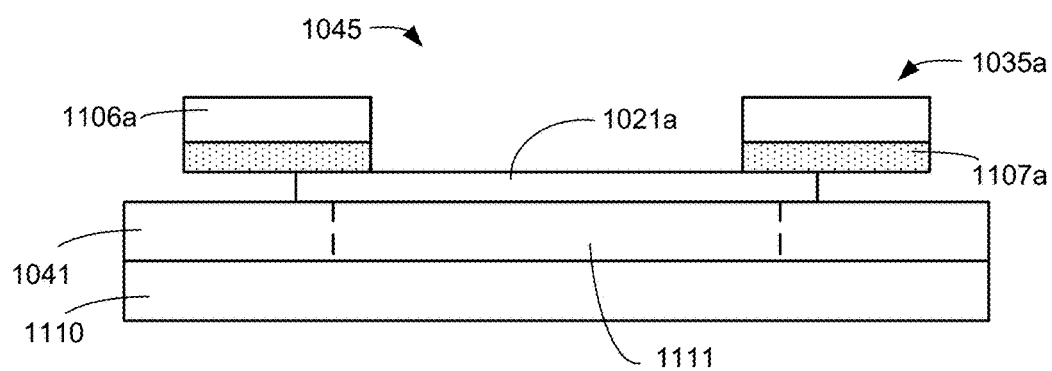
Figure 11N:
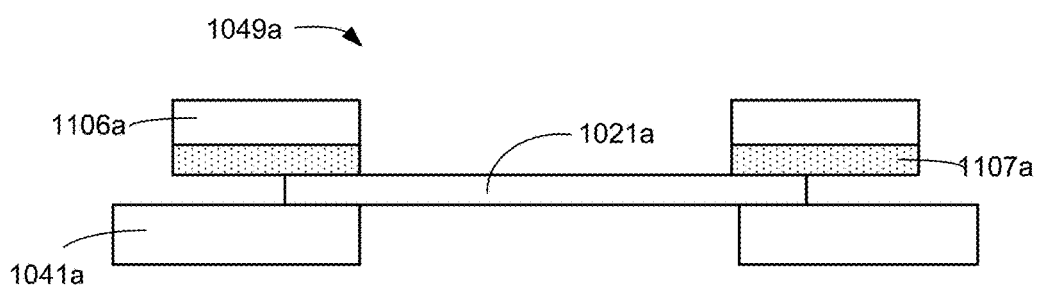

The second subgasket web 1041 (with or without an adhesive layer) is input to subsystem 1050 on a carrier web, e.g., a carrier web having a repositionable adhesive A cross section of the second subgasket web 1041 and carrier web 1110 is illustrated in FIG. 11K. Aperture cuts are made in the second subgasket web 1041 as the second subgasket web 1041 passed between die and anvil rollers 1053, 1054. If an adhesive layer is used, the release liner ladder for the adhesive layer is stripped away at roller 1057. The second gasket web material forming the aperture slugs is left in place on the carrier web. A cross section of the second subgasket web 1041 on the carrier web with the aperture slugs in place 1042 is illustrated in FIG. 11L.

The half subgasketed membrane web 1025 is laminated to the second subgasket web 1042, which is on the carrier web 1110 with the aperture slugs 1111 still in place, as these components pass between roll 1051 and foam or rubber lamination roll 1058. A cross section of the subgasketed membrane web 1045 produced by subsystem 1050 is illustrated in FIG. 11M.

Figure 10E:
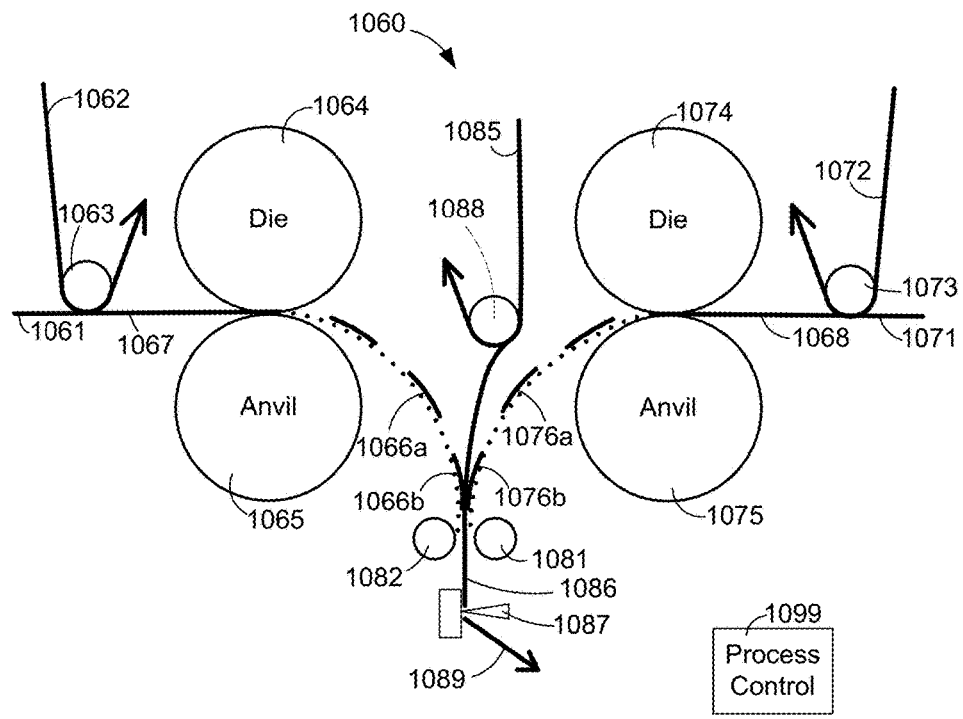

Subsystem 1060 illustrated in FIG. 10E may be used to attach GDLs to a subgasketed membrane web. If an electrolyte membrane without catalyst is used, then the GDLs used for this step may be catalyst coated. If a CCM membrane is used, the GDLs attached in this step may not need catalyst layers. A first GDL web 1061 is input to the subsystem 1060 and an adhesive 1062 is optionally adhered to the GDL web 1061 at roller 1063. The adhesive may be double stick transfer adhesive, dispensed liquid, or a thermally activated adhesive, for example. The adhesive layer may form a porous electrically conductive layer on the GDL web 1061, e.g., if the adhesive is applied across the width of the GDL. The first adhesive GDL web 1067 (first GDL web 1061 plus adhesive 1062) is cut into individual adhesive GDLs 1066a, 1066b as the first adhesive GDL web 1067 passes between die and anvil rollers 1064, 1065. The individual adhesive GDLs 1066a, 1066b are transported to lamination rolls 1081, 1082, e.g., on a vacuum belt or carrier web.

A second GDL web 1071 is input to the subsystem 1060 and an adhesive 1072 layer is adhered to the GDL web 1071 at roller 1073. The adhesive may be double stick tape, dispensed liquid, or a thermally activated adhesive, for example. The adhesive layer forms a porous electrically conductive layer on the GDL web 1071. The second adhesive GDL web 1068 (GDL web 1071 plus adhesive 1072) is cut into individual adhesive GDLs 1076a, 1076b as the second adhesive GDL web 1068 passes between die and anvil rollers 1074, 1075. The individual adhesive GDLs 1076a, 1076b can be transported to lamination rolls 1081, 1082 on a vacuum belt or carrier web.

A subgasketed CCM or electrolyte membrane web 1085, e.g., a subgasketed CCM or electrolyte membrane web as described in connection with FIG. 10 is input to subsystem 1060. The second carrier web with the apertures slugs is peeled away at roll 1088. In some implementations, roll 1088 may be replaced by an angled peel bar. The individual adhesive GDLs 1066a, 1066b, 1076a, 1076b are laminated to the subgasketed CCM or electrolyte membrane 1085 as the individual GDLs 1066a, 1066b, 1076a, 1076b and the electrolyte membrane 1085 pass between lamination rollers 1081, 1082 to form a subgasketed 5-layer MEA web 1086. The subgasketed 5-layer MEA web 1086 may be wound onto a roll or cut, e.g. by sheeter knife 1087 into individual 5-layer MEAs 1089.

The process control module 1099 illustrated in FIGS. 10A-10E includes sensors and control electronics for controlling the relative speed and position of fuel cell subassembly components to ensure proper alignment between the various fuel cell subassembly layers. For example, the process control module 1099 may include one or more sensors that sense an edge of the membrane web 1085 to control the cross web position of the membrane web 1085. In some implementations, fiducials disposed on the membrane web 1085 and/or aligned through cutouts in one or more of the layers of the membrane web may be sensed by sensors of the process control module to control the down web position of the membrane web relative to other fuel cell subassembly components. For example, sensed fiducials may be used to control the positioning of the first and second individual adhesive GDLs 1066, 1076 on the membrane web 1085.

Foamed vacuum die 1012 (see FIG. 10B) is used to cut the CCM or electrolyte membrane web into individual CCMs or individual electrolyte membranes and is illustrated in more detail in the cross sectional view of FIG. 13A and the exploded view of FIG. 13B. The foamed vacuum die 1012 comprises a cylindrical core having a number of die cavities 1316 and gaps 1315 between the die cavities 1316. Vacuum is applied in the die cavities 1316 through holes 1311 in the core 1310. Inserts 1320 are disposed within the die cavities. The inserts 1320 may be made of a foam material that facilitates application of vacuum both through the thickness of the material and laterally within the material. The vacuum applied via the holes 1311 in the core 1310 and through the die cavity inserts 1320 retains the individual electrolyte membranes 1313a, 1313b, 1313c on the surface of the foamed vacuum die. The foam inserts 1320 may include one or a number of porous layers. The material of the foam inserts 1320 is sufficiently compliant to protect the individual electrolyte membranes 1313a, 1313b, 1313c from damage during the manufacturing process.

The foamed vacuum die 1012 includes one or more blades 1312 that extend outward from the surface of the core 1310 and just below the surface 1321 of the foam insert 1320. The blades 1312 are configured to cut a membrane web 1323 (or other type of web) into individual membranes 1313a, 1313b, 1313c as the foamed vacuum die 1012 rotates around its axis. The foam inserts 1320 apply sufficient pressure to the individual membranes 1313a, 1313b, 1313c to allow adhesive attachment of membranes 1313a, 1313b, 1313c to the subgasket web, while providing sufficient compressibility to avoid allowing the die blades 1312 to score the subgasket web 1020 when attaching the membranes 1313a, 1313b, 1313c.

FIG. 13B illustrates the foamed vacuum die 1012 and a process for preparing a foamed vacuum die. The vacuum die 1012 includes a rotatable core 1310 with one or more die blades 1312 having a height of about 0.057 inches extending outward from the surface of the rotatable core 1310. The arrangement of the die blades 1312 defines die cavities 1316 and gaps 1315 between the die cavities 1316. At least within the die cavities 1316, the rotatable core 1310 is perforated with holes 1311 that extend through the outer surface 1319 of the rotatable core 1310 to facilitate application of a vacuum to the outer surface 1319 of the core 1310.

Multi-layer inserts 1320 are disposed within the die cavities 1316. The gaps 1315 between the die cavities 1316 do not have the inserts. To form the inserts 1320, initially a 3.5 mil PET tape layer 1351 is applied to the outer surface 1319 of the core 1310 within the die cavity 1316, followed by a 0.050 inch foam with adhesive layer 1352 and a 6 mil adhesive layer 1353. The 6 mil double stick adhesive layer 1353 initially includes a release liner (not shown). After installation of the insert inner layers comprising the PET tape 1351, foam 1352, and adhesive layer 1353, holes 1361, 1362, 1363 are melted in each of the insert inner layers 1351, 1352, 1353 to facilitate transfer vacuum to the outer surface of the insert 1320. After removal of the release liner, an outer layer of porous breathable through-plane or in-plane material 1354 is adhered to the foam 1352 via the adhesive 1353.

Figure 14:
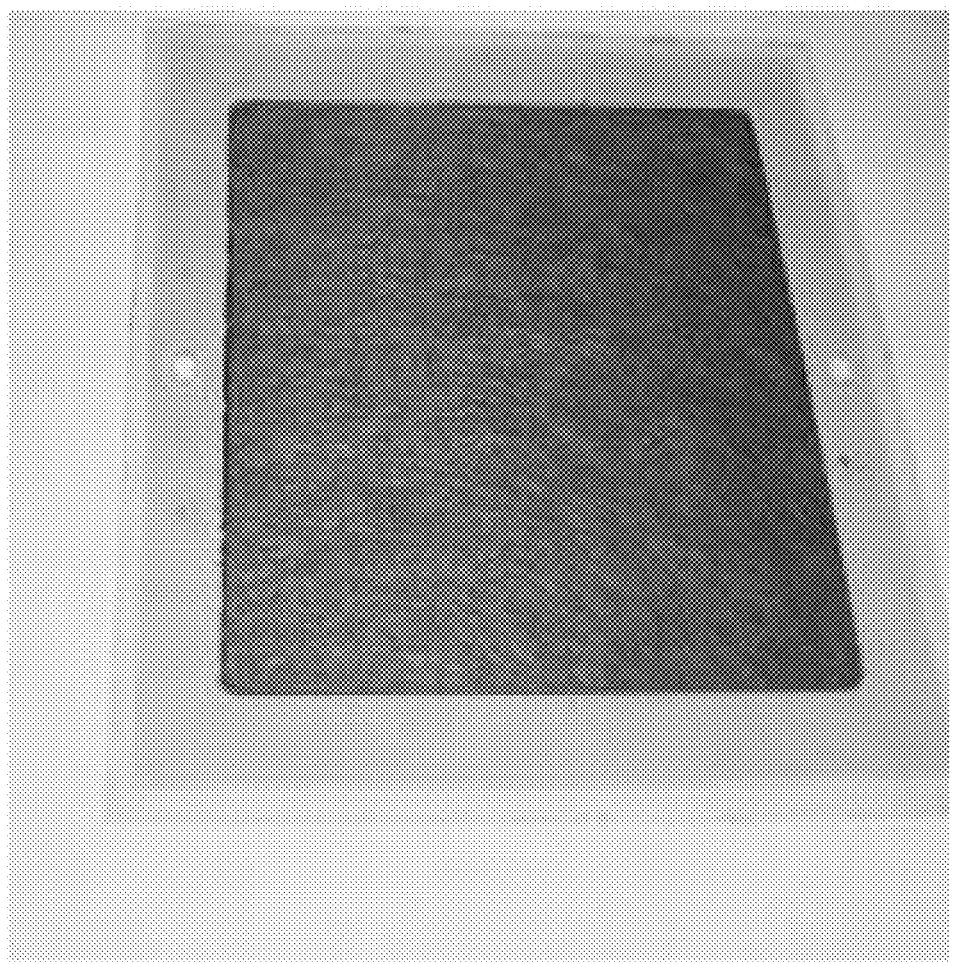
FIG. 14 illustrates a sample MEA construction having a two sided adhesive subgasket prior to temperature testing.

MEAs comprising electrolyte membranes with one sided adhesive subgaskets and two sided adhesive subgaskets were manufactured and temperature tested. FIG. 14 illustrates a sample MEA construction having a two sided adhesive subgasket prior to testing. The subgasket edge overlaps the membrane edge by approximately ⅛ inches.

Figure 15:
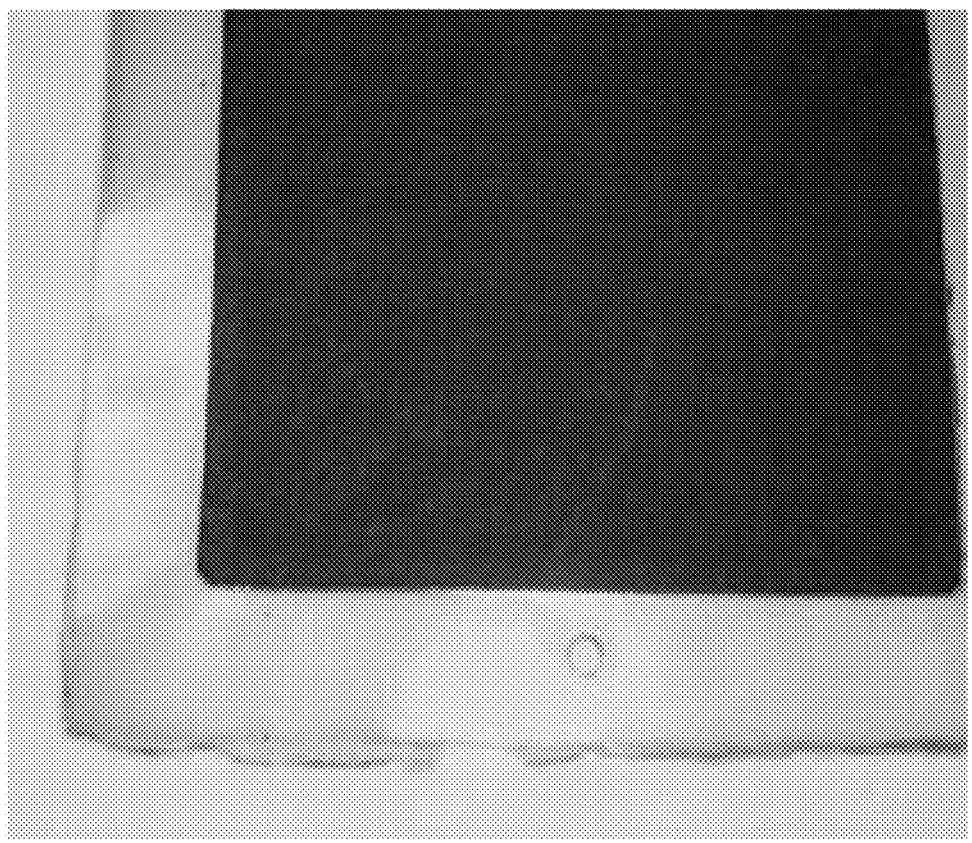
FIG. 15 illustrates the MEA construction of FIG. 15 after temperature testing.

FIG. 15 illustrates the MEA construction of FIG. 15 after temperature testing at 90 C for 20 hours. During heat testing, the membrane became displaced and can be seen protruding through the adhesive-adhesive interface between the two subgaskets. The gasket region of the MEA was compressed to a hardstop for sealing purposes. The pressure in the gasket region combined with the temperature and the ability of the electrolyte membrane to absorb water appeared to cause enough lubrication for the membrane to slip and extrude beyond its intended boundaries. This membrane extrusion beyond boundaries may or may not occur depending on the gasket configuration, compression system, and pressure applied to the gasket region.

Figure 16:
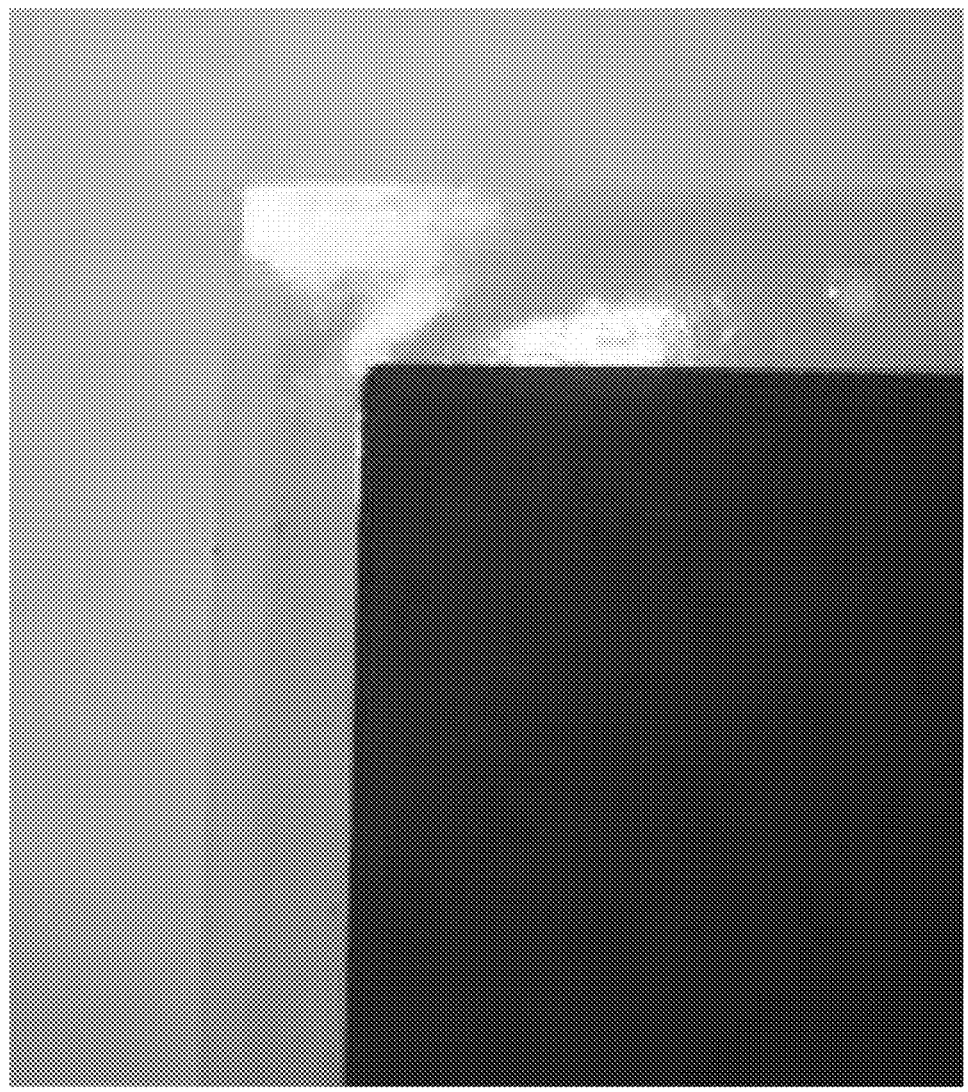
FIG. 16 illustrates an MEA construction that incorporates a one-sided adhesive subgasket on the membrane prior to temperature testing.

FIG. 16 illustrates an MEA construction that incorporates a one-sided adhesive subgasket on the membrane. The subgasket overlaps the membrane edge by about ⅛ inch. In this construction, a first subgasket layer includes an adhesive which bonds the first subgasket layer to the second subgasket layer which does not include adhesive.

Figure 17:
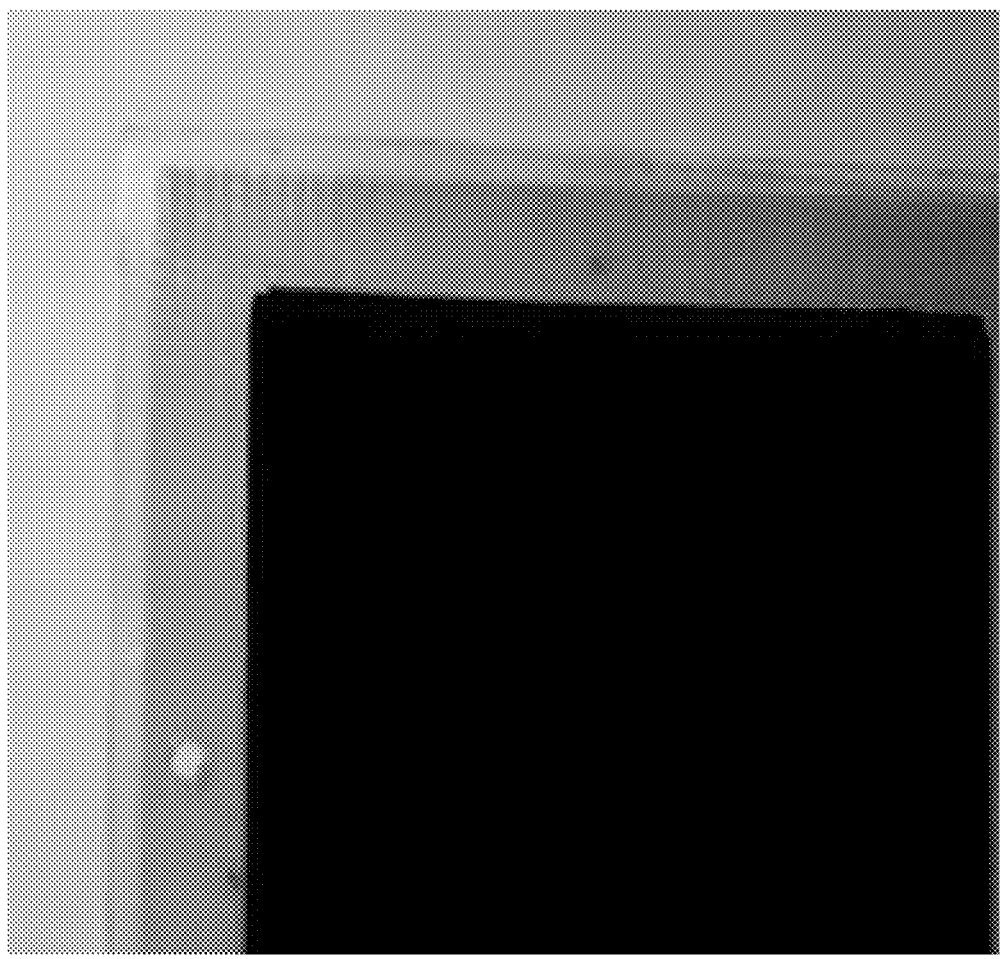
FIG. 17 illustrates the MEA construction of FIG. 18 after temperature testing.

FIG. 17 illustrates the MEA construction of FIG. 16 after temperature testing at 90 C for 20 hours. After testing, the MEA using the one sided adhesive subgasket shows little or no extrusion of the membrane providing a solution to the problem witnessed in FIG. 15.

The foregoing description of the various embodiments of the invention has been presented for the purposes of illustration and description. It is not intended to be exhaustive or to limit the invention to the precise form disclosed. Many modifications and variations are possible in light of the above teaching. For example, the various rotary bonding processes described with reference to the accompanying figures can instead be accomplished using non-rotary methods and apparatuses, such as by use of step and repeat compression processes and apparatuses as are known in the art, for example. It is intended that the scope of the invention be limited not by this detailed description, but rather by the claims appended hereto.

What we claim is:
1. An automated roll to roll method of making a fuel cell roll good subassembly, comprising:
   providing relative motion between an elongated first subgasket web having a plurality of apertures and a plurality of individual pieces of electrolyte membrane, each individual piece of electrolyte membrane having a center region;
   aligning the individual pieces of electrolyte membranes with the first subgasket web so that a center region of each electrolyte membrane is aligned with an aperture of the first subgasket web; and
   attaching the individual pieces of electrolyte membrane to the first subgasket web.
2. The method of claim 1, wherein the first subgasket web is disposed on a repositionable adhesive carrier web.
3. The method of claim 1, further comprising:
   cutting the first subgasket web having the individual pieces of electrolyte membrane attached thereto into a plurality of individual subgasketed membranes;

providing relative motion between a second subgasket web having a plurality of apertures and the plurality of individual subgasketed membranes;

aligning the individual subgasketed membranes with the second subgasket web so that a center region of each electrolyte membrane is aligned with an aperture of the second subgasket web; and attaching the individual subgasketed membranes to the second subgasket web.

4. The method of claim 3, wherein the second subgasket web is disposed on repositionable adhesive carrier web.

5. The method of claim 3, wherein:

the first subgasket web includes a first subgasket surface oriented toward the individual pieces of electrolyte membrane and a first adhesive layer is disposed on the first subgasket surface; and the second subgasket web includes a second subgasket surface oriented toward the individual pieces of electrolyte membrane and at least 25% of the second subgasket surface does not include a second adhesive layer.

6. The method of claim 3, wherein:

the first subgasket web includes a first subgasket surface oriented toward the individual pieces of electrolyte membrane and a first adhesive layer is disposed on the first subgasket surface; and the second subgasket web includes a second subgasket surface oriented toward the individual pieces of electrolyte membrane the second subgasket surface does not include a second adhesive layer.

7. The method of claim 3, wherein the aperture of the first subgasket web is a different size than the aperture of the second subgasket web.

8. The method of claim 1, further comprising:

providing relative motion between a second subgasket web having a plurality of apertures and the first subgasket web having the individual pieces of electrolyte membrane attached thereto;

aligning the second subgasket web with the first subgasket web having the individual pieces of electrolyte membrane attached thereto so that a center region of each electrolyte membrane is aligned with an aperture of the second subgasket web; and attaching the first subgasket web having the individual pieces of electrolyte membrane attached thereto to the second subgasket web.

9. The method of claim 8, wherein:

the first subgasket web includes a first subgasket surface oriented toward the individual pieces of electrolyte membrane and a first adhesive layer is disposed on the first subgasket surface; and the second subgasket web includes a second subgasket surface oriented toward the individual pieces of electrolyte membrane and the second subgasket surface does not include a second adhesive layer.

10. The method of claim 8, wherein one or both of the first subgasket web and the second subgasket web are disposed on a repositionable carrier web.

11. The method of claim 1, further comprising:

moving an electrolyte membrane web into contact with a rotating die; and cutting the electrolyte membrane web into the individual pieces of electrolyte membrane using the rotating die.

12. The method of claim 11, wherein the rotating die comprises a rotating vacuum die that retains the individual pieces of electrolyte membrane on a surface of the rotating die and moves the individual pieces of electrolyte membrane into contact with the first subgasket web.

13. The method of claim 12, wherein the rotating die comprises:

a cylindrical core;

die blades on the cylindrical core defining die cavities and gaps between the die cavities; and compliant die cavity inserts disposed within the die cavities.

* * * * *